US007904673B2

(12) United States Patent
Riska et al.

(10) Patent No.: US 7,904,673 B2
(45) Date of Patent: Mar. 8, 2011

(54) DATA STORAGE DEVICE WITH HISTOGRAM OF IDLE TIME AND SCHEDULING OF BACKGROUND AND FOREGROUND JOBS

(75) Inventors: Alma Riska, Mars, PA (US); Ningfang Mi, Williamsburg, VA (US); Evgenia Smirni, Willliamsburg, VA (US); Erik Riedel, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 612 days.

(21) Appl. No.: 11/942,781

(22) Filed: Nov. 20, 2007

(65) Prior Publication Data

US 2009/0132754 A1    May 21, 2009

(51) Int. Cl.
*G06F 12/00* (2006.01)
(52) U.S. Cl. ......................................... 711/154
(58) Field of Classification Search .................. None
See application file for complete search history.

(56) References Cited

U.S. PATENT DOCUMENTS

| | | | | |
|---|---|---|---|---|
| 6,078,998 | A | 6/2000 | Kamel et al. | 711/151 |
| 6,665,740 | B1 * | 12/2003 | Mason et al. | 710/6 |
| 6,760,807 | B2 | 7/2004 | Brant et al. | 711/114 |
| 7,146,439 | B1 * | 12/2006 | Ofer et al. | 710/45 |
| 7,225,293 | B2 | 5/2007 | Lamberts | 711/112 |
| 7,549,129 | B2 * | 6/2009 | Sheldon et al. | 715/835 |
| 2001/0034558 | A1 | 10/2001 | Hoskins | 700/13 |
| 2002/0002655 | A1 | 1/2002 | Hoskins | 711/112 |
| 2003/0093640 | A1 | 5/2003 | Mowery et al. | 711/167 |
| 2004/0088384 | A1 | 5/2004 | Taylor et al. | 709/219 |
| 2004/0186951 | A1 | 9/2004 | Iren et al. | 711/112 |
| 2004/0264284 | A1 | 12/2004 | Priborsky et al. | 365/232 |
| 2006/0288184 | A1 | 12/2006 | Riska et al. | 711/167 |
| 2007/0185902 | A1 | 8/2007 | Messinger et al. | 707/103 |

OTHER PUBLICATIONS

Fred Douglis, P. Krishnan, and Brian N. Bershad, "Adaptive disk spin-down policies for mobile computers," pp. 121-137, *Proceedings of the 2nd USENIX Symposium on Mobile and Location-Independent Computing* 1995.

David P. Helmbold, Darrell D. E. Long, and Bruce Sherrod, "A dynamic spin-down technique for mobile computing," pp. 130-142, *Mobilcom '96: Proceedings of the 2nd Annual International Conference on Mobile Computing and Networking*, ACM Press, NY, USA, 1996.

* cited by examiner

*Primary Examiner* — Hiep T Nguyen
(74) *Attorney, Agent, or Firm* — Westman, Champlin & Kelly, P.A.

(57) ABSTRACT

A data storage device includes a cumulative data histogram of lengths of idle times between foreground user service requests. The cumulative data histogram is updated with measured lengths of current idle times between successive user service requests. Background service request are scheduled following a user service request after a time delay that is controlled as a function of the cumulative data histogram and a calculated length of a busy time of the background service request.

20 Claims, 17 Drawing Sheets

DATA STORAGE DEVICE WITH HISTOGRAM OF IDLE TIME AND SCHEDULING OF BACKGROUND AND FOREGROUND JOBS

BACKGROUND OF THE INVENTION

Systems for scheduling foreground and background tasks in a disc drives are known. These known systems, however, typically rely on feedback of measures of an amount of tasks performed and take control action that is suboptimal or which may even worsen the performance of foreground tasks.

Embodiments of the present invention provide solutions to these and other problems, and offer other advantages over the prior art.

SUMMARY OF THE INVENTION

Disclosed is a data storage device. The data storage device comprises a cumulative data histogram. The cumulative data histogram comprises a distribution of past lengths of idle times between successive foreground user service requests.

The data storage device comprises an update circuit. The update circuit updates the cumulative data histogram with measured lengths of current idle times between successive user service requests.

The data storage device comprises a schedule circuit. The schedule circuit schedules a background service request following a user service request after a time delay. The time delay is controlled as a function of the cumulative data histogram and a calculated length of a busy time of the background service request.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, a data storage device schedules background and foreground work. The data storage device includes a cumulative data histogram of a distribution of past lengths of idle times between successive foreground user service requests. An update circuit updates the cumulative data histogram with measured lengths of current idle times between successive user service requests. A schedule circuit schedules a background service request following a user service request after a time delay that is controlled as a schedule function of the cumulative data histogram and a calculated length of a busy time of the background service request.

Figure 1A:
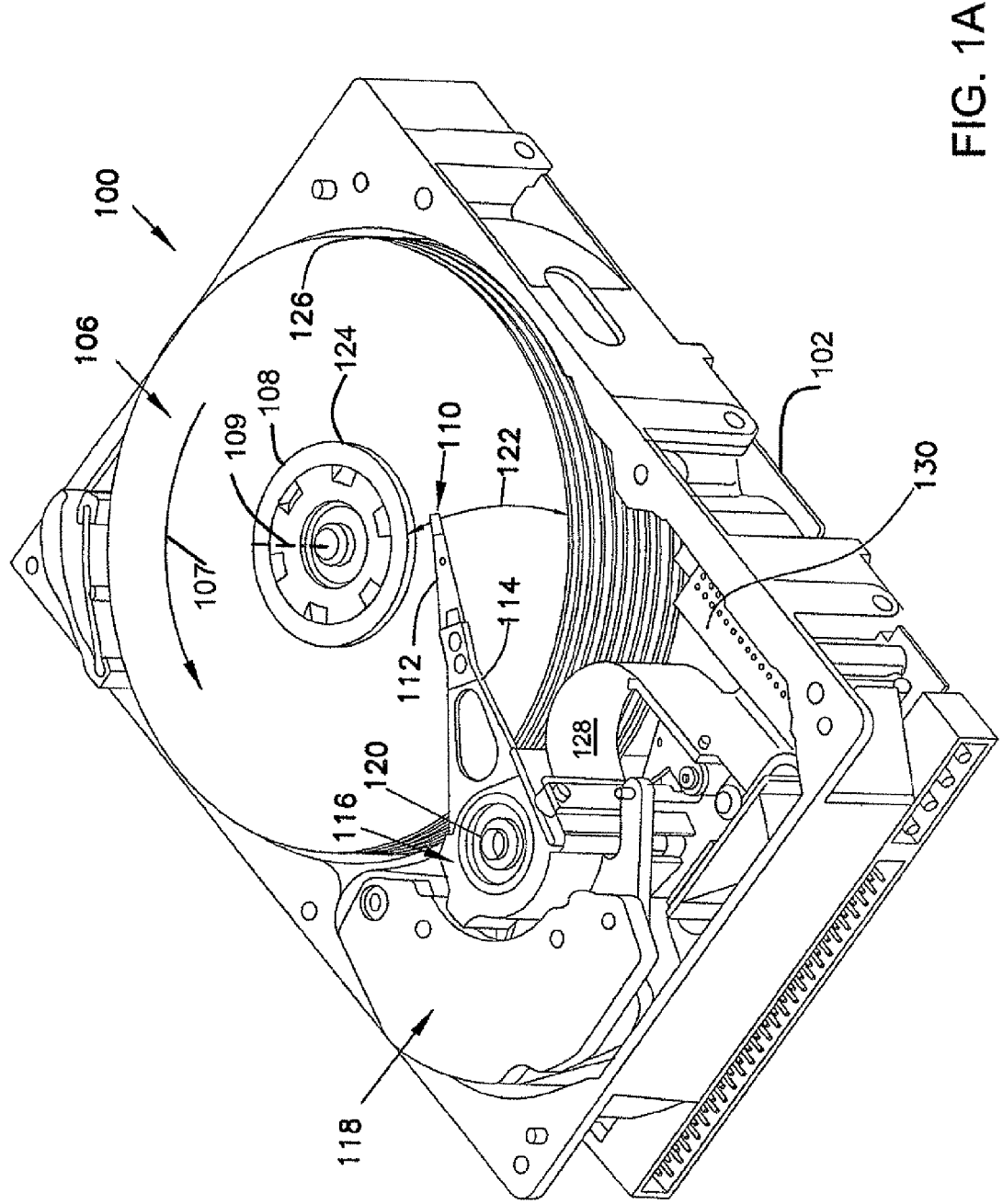
FIG. 1A illustrates a disc drive.

FIG. 1A is an oblique view of a disc drive 100 in which disclosed aspects are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about central axis 109. Each disc surface has an associated disc head slider 110 which is mounted to disc drive 100 for communication with the disc surface. The disc head sliders 110 are electrically connected by way of a flex circuit 128 to electronics 130. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by electronics 130 based on signals generated by heads 110 and a host computer (not shown). The disc drive 100 illustrated in FIG. 1A is merely exemplary, and other types of data storage devices can be used as well.

Figure 1B:
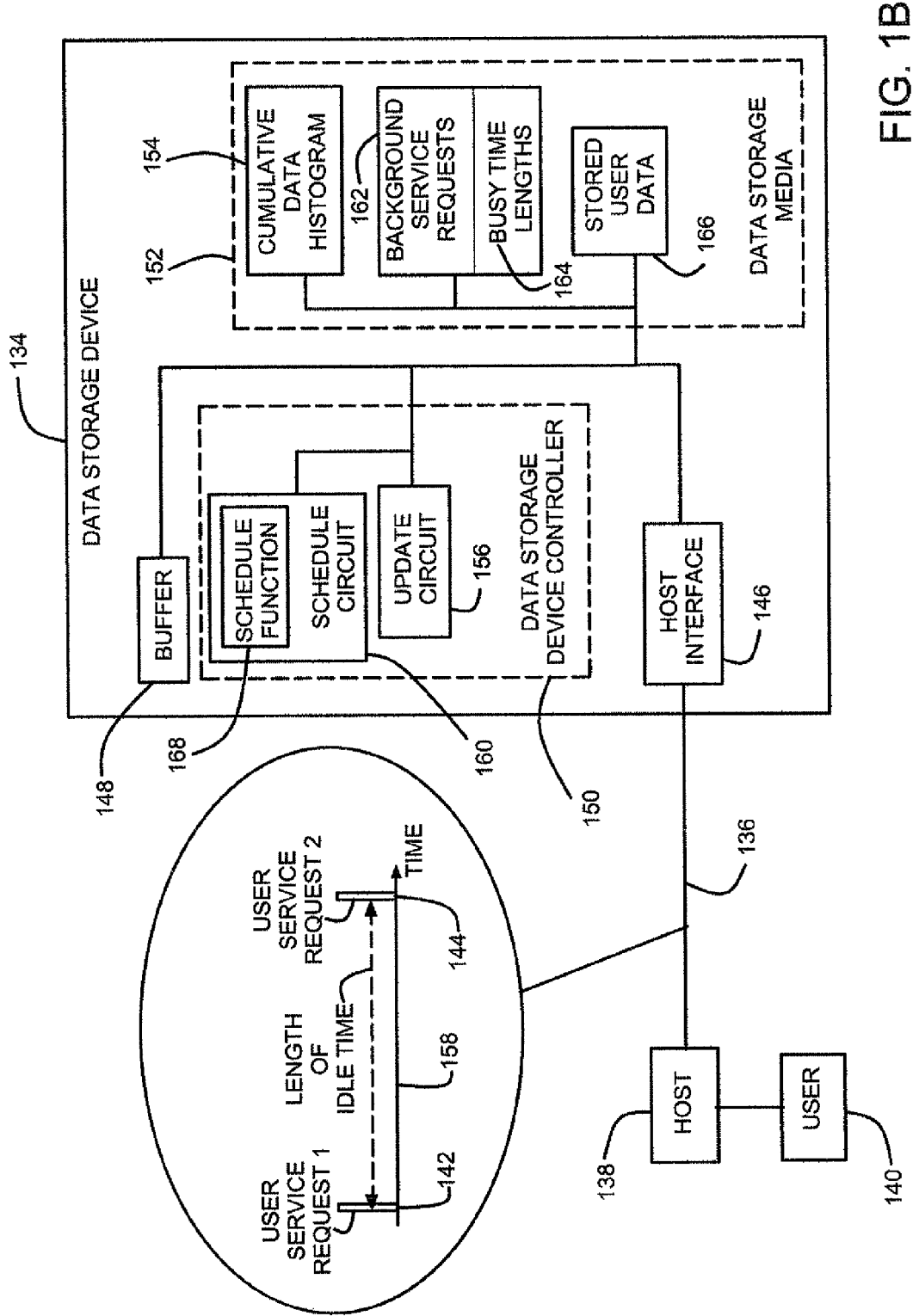
FIG. 1B illustrates a block diagram of a data storage device.

FIG. 1B illustrates a data storage device 134. The data storage device 134 is coupled by a bus 136 to a host 138. The host 138 typically comprises a computer. The host 138 is used by a user 140. The actions of the user 140 in operating the host 138 generate a stream of user service requests such as user service requests 142, 144 that are coupled by the bus 136 to the data storage device 134. User service requests are also referred to herein as "foreground" requests. Foreground requests are scheduled with a higher priority that "background" requests that are generated internally in the data storage device 134, or in some cases generated autonomously by the host 138. The user 140 is aware of any delays in servicing the foreground requests, but is usually not aware of and not interested in delays in servicing background requests.

The data storage device 134 comprises a host interface circuit 146 that couples data and control information between the bus 136 and circuitry that is internal to the data storage device 134. The data storage device 134 comprises a buffer 148, a data storage device controller 150 and data storage media 152 that are coupled to the host interface 146. According to one aspect, the data storage media 152 comprises magnetic storage media. According to another aspect, the data storage media 152 comprises ferroelectric storage media. According to yet another aspect, the data storage media comprises flash memory storage media.

A cumulative data histogram 154 is stored on the data storage media 152. The cumulative data histogram 154 comprises a distribution of past lengths of idle times between successive foreground user service requests.

An update circuit 156 is included in the controller 150. The update circuit 156 updates the cumulative data histogram 154 with measured lengths of current idle times between successive user service requests, such as measured length 158.

The data storage media 152 includes data that represents background service requests 162 and calculated busy time lengths 164 associated with each background service request 162. The data storage media stores user data 166.

A schedule circuit 160 is included in the controller 150. The schedule circuit 160 schedules background service requests 162 following a user service request (such as user service request 142) after a time delay that is controlled by the schedule circuit 160 as a schedule function 168 of the cumulative data histogram 154 and a calculated maximum length 164 of a busy time of the background service request 162. In case a user foreground job arrives before the maximum background busy time is reached, the algorithm allows the current background job to finish, but no additional background jobs are started. The schedule function 168 schedules background work to reduce an average wait time for starting service of subsequent foreground user service request, such as user service request 144.

Background tasks represent activities with lower priority than user traffic, i.e., foreground tasks, in a data storage device. Common background tasks aim at enhancing system reliability, performance, and consistency. Because foreground tasks have higher priority, background tasks are scheduled only when there are no foreground tasks in the system, i.e., during system's idle times. Hence idle times are considered a valuable resource in a system and their efficient management becomes critical to system performance and reliability. If background tasks are non-instantaneously preemptive then, because of the stochastic nature of foreground tasks arrivals, the performance of foreground tasks will be compromised when both background and foreground tasks are scheduled in a system. There is a design issue of how to bin-pack non-preemptive background jobs during system idle times such that first, foreground performance degradation is contained within predefined relative limits and, second, background tasks performance, i.e., its completion rate and/or response time, is as good as possible. One design goal is to dynamically incorporate changes the user activity conditions into the way in which the uses of idle times are managed. The background activities are categorized based on the amount of work time (i.e., infinite or finite) needed to complete a background task and the buffer requirements of the background task (i.e., with or without buffer requirements). The term "infinite" as used in this application refers to repetitive tasks that cumulatively use an amount of time that is much larger than most idle times in the data storage device.

Example Solution

An algorithm disclosed herein determines dynamically, first, the amount of time to wait in every idle period before any background task is scheduled for service, and, second, the amount of background tasks to be served once the system starts scheduling background work. The exemplary disclosed algorithm is "non-work conserving" because the data storage device may remain idle even if background activities are waiting to be scheduled, with the goal to meet the foreground performance targets. The algorithm bases its decisions on on-line monitoring of the distribution of idle times by building a cumulative data histogram (CDH), service demands of foreground and background tasks, and the performance of foreground jobs without the presence of background tasks. This information is used to compute the portion of idle periods that can delay an incoming foreground busy period without violating the foreground performance targets. Once this is known, the idle waiting and background work to be served every idle period are calculated.

Algorithm Example

Because of the stochasticity in the system (i.e., arrivals of foreground tasks and their service) and the non-instantaneous preemptive nature of the background tasks, there are foreground busy periods that will be delayed by the background busy periods despite the fact that foreground tasks have always higher priority than background ones. Thus, foreground tasks will experience longer waiting times and, if not monitored, these waiting times can be arbitrary large and affect user perceived performance.

The example algorithm determines when and for how long the system should schedule background tasks such that the foreground performance is contained within predefined limits. This means that serving background tasks should increase foreground response time by at most DD×100%, where DD stands for "desired degradation". By denoting $RT_{w/BG}$ and $RT_{wo/BG}$, respectively, the foreground request response time with and without background tasks in the systems, the relation shown in Equation 1 holds.

$$DD = \frac{RT_{w/BG} - RT_{wo/BG}}{RT_{wo/BG}} \qquad \text{Equation 1}$$

In a data storage device that schedules background work, an "idle waiting" strategy is used to avoid utilizing the very short idle periods for scheduling of background tasks. Currently, the idle wait is often fixed and sometimes associated with the average service time of background tasks. The algorithm disclosed herein monitors the idle periods in the system and other metrics to make decisions for future scheduling using the monitored past. Analysis on the effectiveness of idle wait shows that it depends particularly on the statistical characteristics of the idle times in the system. For example, if the idle times distribution has low variability then idle waiting is less effective. It becomes more effective as the variability in the idle times distribution increases.

However, to guarantee foreground performance targets (i.e., a maximum of DD×100% increase in foreground response times), it is necessary to limit the amount of background work served in an idle period. This becomes particularly important when there is more background work than the system idleness can accommodate. Consequently, the algorithm determines the tuple (IW, $T_E$), where IW denotes the idle wait and $T_E$ denotes the amount of time that the system will schedule background tasks once IW has elapsed. Because background tasks have lower priority than foreground ones, if a foreground task arrives during a background service, then the background busy period is preempted even if the amount of time $T_E$ has not elapsed. The disclosed algorithm is adaptive because the decision to select a particular 2-tuple (IW, $T_E$) changes as system conditions change. The major notations used in the disclosed algorithms are listed in Table 1 and Table 2 below.

TABLE 1

List of Notations used in the estimation of E

E the portion of idle periods that can cause a delay to the incoming foreground busy periods without violating the desired performance targets
DD the desired slowdown of foreground jobs
$RT_{wo/BG}$ the foreground request response time without background tasks in the systems
$RT_{w/BG}$ the foreground request response time with background tasks in the systems
$S_{BG}$ the average service demands of background tasks for (T, P, C),
T represents the smallest point in a range of idle intervals lengths
P represents the corresponding empirical probability of occurrence (P = P($idle_{interval}$ = t))
C represents the corresponding empirical cumulative probability of occurrence (C = P($idle_{interval}$ <= t))
n the number of foreground jobs during a window of time over which the calculation is done
$n_0$ the number of foreground jobs that are not delayed
i the index of the foreground job
$Delay^i$ the delay in the response time of the ith foreground job caused by servicing background tasks
k the index of the propagated delay level
K the maximum propagated delay level (i.e., 10)
$n_k$ the number of foreground tasks whose background caused delay has propagated through k consecutive foreground busy periods
$E_k$ the probability that the idle interval is shorter than $S_{BG}/2^{k-2}$ for $2 \leq k \leq K$.
END OF TABLE 1

TABLE 2

List of notations used in estimation of tuple (IW, $T_E$)

IW the idle waiting time
$T_E$ the amount of time that the system will schedule background tasks once IW has elapsed
o the index of the choice of tuple (IW, $T_E$)
r the index of a subinterval for servicing r background jobs
R the upper limit for r is such that $T_r^o - T_{Begin}^o \leq T_E^o$
$W^o$ the amount of background work that can be accomplished by idle waiting $IW^o$ and serving only for $T_E^o$ units of time
$W_{max}$ the largest amount of background work $W^o$
M the average number of background tasks generated every foreground busy period
$W_F$ the finite background work to be completed
B the average number of background tasks the buffer can hold
d the index of the busy period
$M_d$ the number of background tasks that are generated in the dth busy period
$D_{Bursty}$ the average number of the dropped background jobs because one busy period generated more than B background tasks
$DR_{Bursty}$ the corresponding dropping rate due to the burstiness
m the number of background tasks that can be served in an idle period
$M'_{Less}$ the maximum number of background tasks that need to be served in an idle period, i.e., min{⌈M'/(1 − C(IW))⌉, B}, where the brackets "⌈ ⌉" represent the ceiling function TABLE 2-continued List of notations used in estimation of tuple (IW, $T_E$)

$D_{Cum}$ the average number of background tasks to be dropped every 1/(1 − C(IW)) busy periods because of accumulation of outstanding background tasks
$DR_{Cum}$ the corresponding drop rate due to the accumulation.
END OF TABLE 2

Algorithm's Input Parameters

In addition to the targeted foreground performance degradation DD, the set of input parameters in the disclosed algorithm is obtained via on-line monitoring of the data storage device's conditions. Specifically, the algorithm uses monitoring of the length of idle times to build the histogram of idle times,
the average service demands of foreground and background tasks,
the average foreground response time without background tasks, i.e., $RT_{wo/BG}$,
the number of background tasks generated every foreground busy period to build the corresponding histogram. (Note: This metric is monitored only when background tasks are generated from the incoming foreground traffic during the busy periods. An example background task of this type would be a verification of the written content upon completion of every WRITE operation.)

The above metrics monitored in the data storage system represent the list of input parameters in the disclosed algorithm with the histogram of idle times as the most important one. The cumulative data histogram, CDH, is the main data structure used. Although CDH is shown graphically throughout this report (see FIG. 1C), its data structure is actually a list of 3-tuples (T, P, C), where T represents the smallest point in a range of idle intervals lengths (i.e., the histogram bin), P represents the corresponding empirical probability of occurrence (P=P($idle_{interval}$=t)), and C represents the corresponding empirical cumulative probability of occurrence (C=P($idle_{interval}$≦t)), The smaller the length of histogram bins that determines the T points in the CDH, the more accurate the CDH is and consequently the algorithm accuracy increases with smaller length histogram bins.

The disclosed algorithm does not require a feedback-loop type algorithm, where system parameters are changed to different values (often obliviously) when noticing that the current ones do not perform well. The main difference is that the presently disclosed algorithm monitors data storage device conditions and captures them with the corresponding histograms, while feedback-loop algorithms (typical of shut down systems in mobile computers) measure the effects on system performance of a set of system parameters and conditions. The disclosed algorithm can adapt quickly and appropriately to changes in the system conditions. Examples of feedback-loop algorithms that apply on spinning down the disk drives to conserve power in mobile devices and backup storage centers use the feedback-loop approach to determine the idle wait. However, they do not disclose how to solve a second issue of how long the background busy period should last.

Figure 1C:
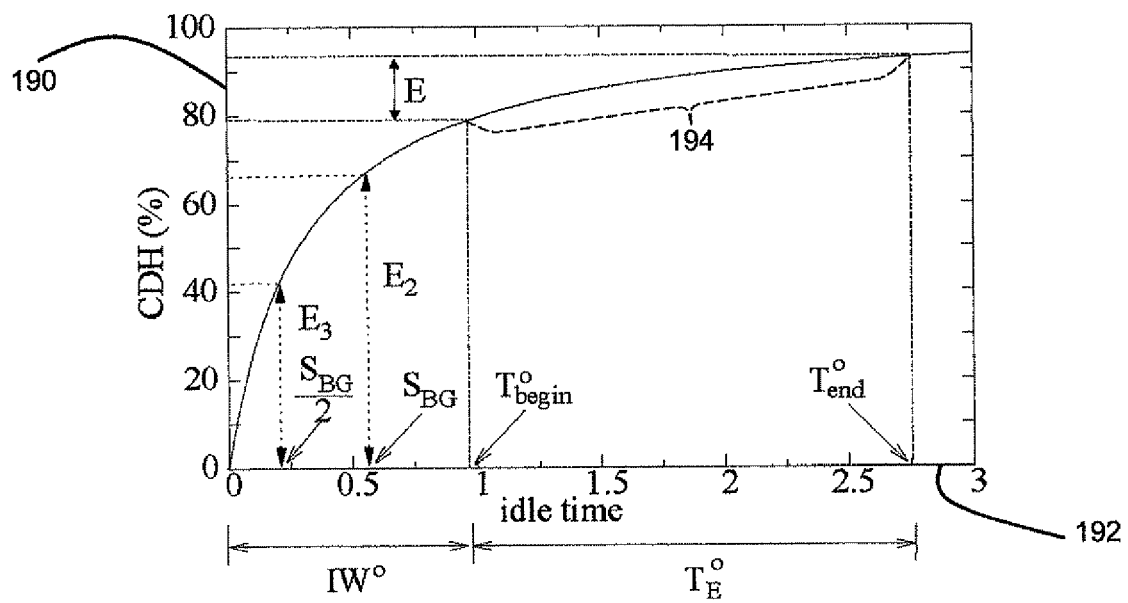
FIG. 1C illustrates a transition from E to $T_E$ in a cumulative data histogram.

FIG. 1C illustrates a transition 194 from E to $T_E$ in a cumulative data histogram. The C-values are depicted on the Y-axis 190 and determine the corresponding T-values depicted on the X-axis 192. FIG. 1C also depicts how E can be anywhere in the Y-axis (between 0 and 100%) while other probabilities $E_2, E_3, \ldots, E_K$ are fixed and determined by $S_{BG}$.

FIG. 1C is clarified by restricting the scale of the X-axis 192 and the Y-axis 190. Large values of the X-axis 192 and the Y-axis 190 are not shown.

Broader Aspects of the Algorithm

While the details of the algorithm are described below, some broader aspects include:

1—From the foreground performance target (i.e., DD), it is computed the portion (i.e., E×100%) of idle periods that can cause a delay to the incoming foreground busy periods without violating the desired performance targets.

2—Using the cumulative histogram of idle times, the portion E of idle times is mapped to an amount of time TE and consecutively to a tuple (IW, $T_E$). A high level depiction of this mapping is presented in FIG. 1C. We start from values in the y-axis 190 and map them to the corresponding values on the x-axis 192.

3—If E<1, then there are more than one option to select the tuple (IW, $T_E$). The distinction is made using categorization of the amount of work required by the background tasks.

4—The algorithm distinguishes between infinite amount of background work (for example repeating background media scans) and finite amount of background work (for example parity updates if there is an intra-disk parity feature in the data storage device). The finite amount of work is further categorized on those that do not have any buffer requirements and those that have buffer requirements (for example idle read after write requires buffer space, while some parity update implementations do not if the data on the data storage media is used).

5—For infinite amount of background work, the goal is to complete as much as possible background work. So the tuple (IW, $T_E$) is chosen to maximize the amount of work that can be accomplished.

6—For finite amount of background work, the goal is to complete the required amount of work as fast as possible. This means that the tuple (IW, $T_E$) should be the one that ensure work completion with the shortest amount of IW. If the finite amount of work is greater than the maximum amount of background work that can be served in the system, then this case reduces to the case of the infinite background work.

7—The difference between finite background work with and without buffer requirements is that when there is buffer space requirement some of the background work will be dropped because the buffer is full. The algorithm estimates the amount of work to be dropped and makes decisions on the best tuple (IW, $T_E$) using the reduced required amount of background work. If a zero dropping rate is estimated then the case of finite work with buffer requirements is reduced to the case of finite amount of work without buffer requirements.

Estimation of E

Estimation of E is a first or early step in the disclosed algorithm, starting from Equation 1. The first term in Equation 1 is the response time of foreground tasks without background activity (i.e., $RT_{wo/BG}$) which is expected to be an input in the algorithm. One way to calculate $RT_{wo/BG}$ is to sum up all foreground response times (without including the delay caused by background tasks) over a period of time and divide it with the number of foreground jobs served during that time. The other term in Equation 1 can be expressed in a form where E, the portion of idle periods that cause delays in foreground busy periods without violating the performance targets, is the only unknown.

When there are n foreground jobs during a window of time over which the calculation is done, and also when there are $0 \leq n_o \leq n$ foreground jobs that are not delayed, then consequently there are $n-n_o$ foreground jobs that are delayed by a background busy period.

$$RT_{w/BG} = \frac{1}{n}\left(\sum_{i=1}^{n_0} RT^i_{wo/BG} + \sum_{i=1}^{n-n_0}(RT^i_{wo/BG} + Delay^i)\right) \quad \text{Equation 2}$$

$$= \frac{1}{n}\left(\sum_{i=1}^{n} RT^i_{wo/BG} + \sum_{i=1}^{n-n_0} Delay^i\right)$$

$$= RT_{wo/BG} + \frac{\sum_{i=1}^{n-n_0} Delay^i}{n}$$

where $RT_{wo/BG}^i$ indicates the average foreground request response time for that specific job and $Delay^i$ is the corresponding delay caused by servicing background tasks.

If a background busy period delays an incoming foreground busy period, then the delay affects, with the same absolute amount, the waiting time in the queue of all foreground jobs for that particular busy period. The delay amount is at most the average service time of a background task, which it is denoted by $S_{BG}$ and estimated via data storage device monitoring (as discussed above).

Figure 2:
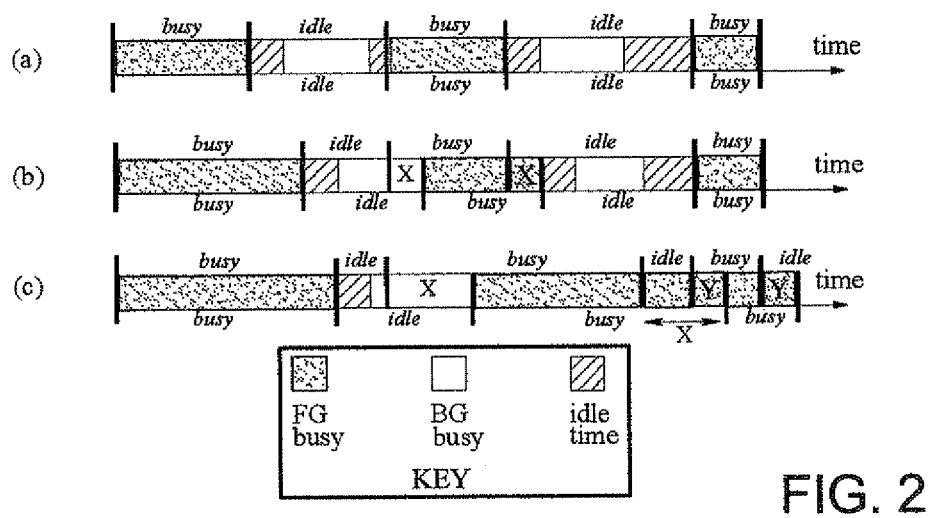
FIG. 2 illustrates delays in foreground busy periods from background busy periods.

When a foreground busy period is delayed by X ms, if the next idle period is smaller than X then also the following foreground busy period will be delayed by Y ms where Y=X−$Length_{Idle}$, as shown in FIG. 2. Considering only cases where, if a foreground busy period is delayed, then the consecutive idle periods are very small and cause the delay to propagate through multiple foreground busy periods. Although delays can theoretically propagate through infinite foreground busy periods, in the calculations the propagation is limited by at most K consecutive foreground busy periods. During an evaluation of the disclosed algorithm K is set to be 10. The symbol $n_k$ denotes the number of foreground tasks whose background caused delay that has propagated through k (such that $1 \leq k \leq K$) consecutive foreground busy periods. Since the direct delay per busy period is estimated to be $S_{BG}$, then the propagated delays are estimated to be $S_{BG}/2^{k-1}$ for the $k^{th}$ propagated delay.

FIG. 2 illustrates delays in foreground busy periods from background busy periods. The illustrated case in FIG. 2 are (a) no foreground busy periods are delayed; (b) only one foreground busy period is delayed by X ms; and (c) one foreground busy period is delayed by X ms and a consecutive foreground busy period is delayed by Y ms.

Using the above notations, the term Delay in Equation 2 can be expressed as $$\sum_{i=1}^{n-n_0} Delay^i = \sum_{k=1}^{K}\sum_{i=1}^{n_k} S_{BG}/2^{k-1} \quad \text{Equation 3}$$

$$= \sum_{k=1}^{K} n_k * S_{BG}/2^{k-1}$$

Combining together Equations 2 and 3, an expression for the foreground response time with background tasks is derived as shown in Equation 4

$$RT_{w/BG} = RT_{wo/BG} + \frac{\sum_{k=1}^{K} n_k * S_{BG}/2^{k-1}}{n}$$

$$= RT_{wo/BG} + \sum_{k=1}^{K} \frac{n_k}{n} * S_{BG}/2^{k-1}$$

Equation 4

The term $n_k/n$ for $1 \leq k \leq K$ can be approximated by the probability that the background delay has propagated k foreground busy periods (by dividing with the average number of foreground jobs per busy period, the fraction indicates that probability). All probabilities $n_k/n$ for $2 \leq k \leq K$ are conditional probabilities, that is delay should have propagated through (k−1) foreground busy period before it propagates through k of them.

For k=1, the probability that a background busy period delays the immediately following foreground busy period is shown in case (b) in FIG. 2. This probability represents E, which is what is desired to actually estimate as the first step in our algorithm. For k=2, $n_2/n$ represents the probability that given that a delay has occurred, it propagates through two foreground busy periods as shown in case (c) in FIG. 2. Because the average delay for the first delayed foreground busy period is $S_{BG}$, $n2/n = E \times E_2$ where $E_2$ is the probability that the idle period is less than $S_{BG}$ in length. By denoting $E_k$ as the probability that the idle interval is shorter than $S_{BG}/2^{k-2}$ for $2 \leq k \leq K$, we the probabilities $n_k/n$ for $2 \leq k \leq K$ are expressed in Equation 4A:

$$\frac{n_k}{n} = E \times \prod_{l=2}^{k} E_l \text{ where } 2 \leq k \leq K.$$

Equation 4A

Finally, the foreground response time with background tasks is expressed as shown in Equation 5:

$$RT_{w/BG} = RT_{wo/BG} + E * S_{BG} + \sum_{k=2}^{K} E * \prod_{l=2}^{k} E_l * S_{BG}/2^{k-1}$$

Equation 5

From Equation 5 and Equation 1, the unknown E can be calculated in terms of the other known parameters in the system as Equation 6:

$$E = \frac{DD \times RT_{wo/BG}}{S_{BG} * \left(1 + \sum_{k=2}^{K} \prod_{l=2}^{k} E_l * 1/2^{k-1}\right)}$$

Equation 6

There is a difference between E and $E_k$ for $2 \leq k \leq K$. As illustrated in FIG. 1C, E represents any one segment of length E between 0 and 1 (y-axis in FIG. 1C) resulting in multiple choices for E. On the contrary, each of the probabilities $E_k$ for $2 \leq k \leq K$ represents only one single value, which is specifically the probability that the idle interval is of a certain length. This is the reason why the notation distinguishes E and $E_k$ for $2 \leq k \leq K$. The algorithm to compute E is illustrated in FIG. 3.

Figure 3:
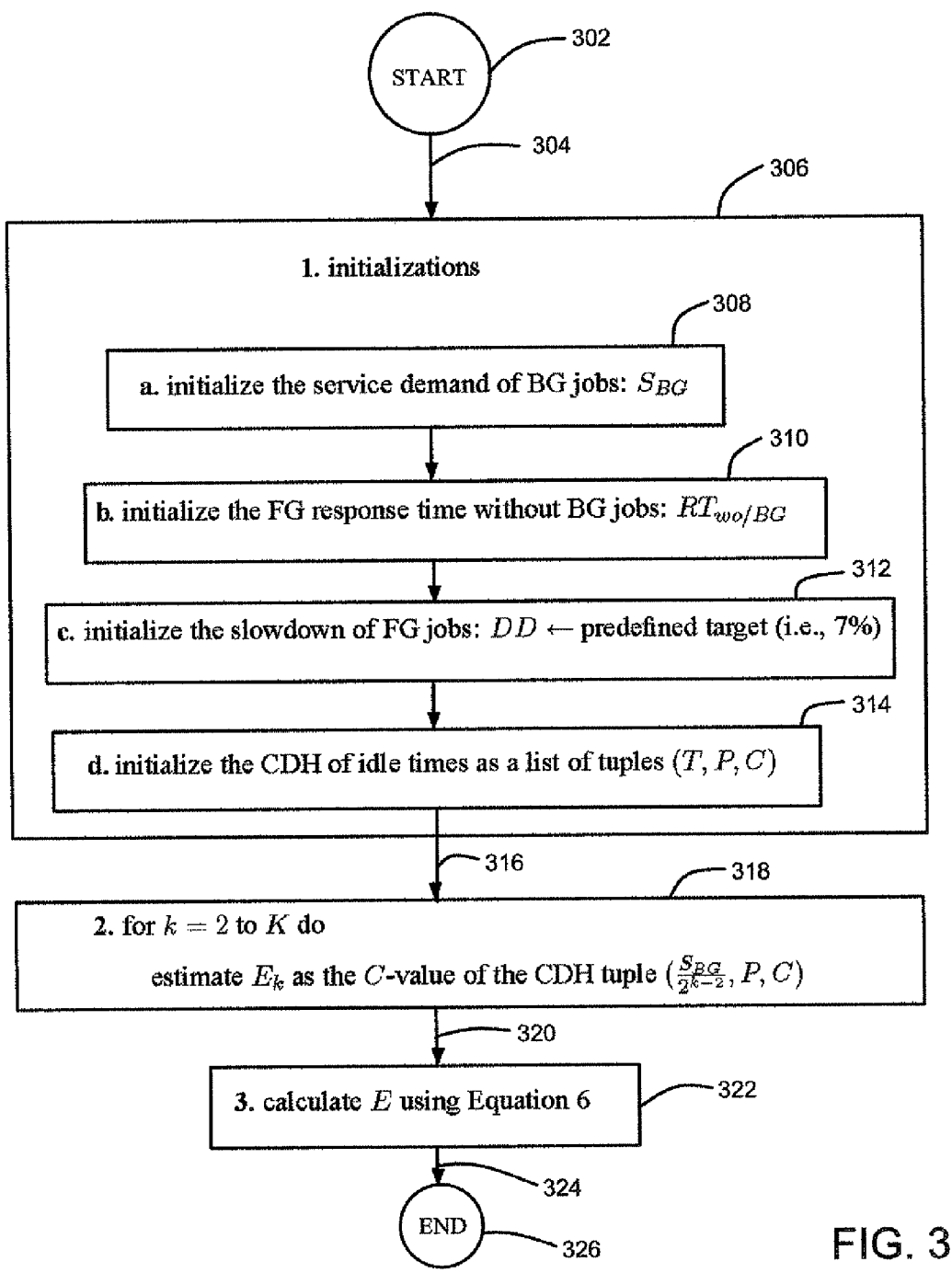
FIG. 3 illustrates an algorithm to compute E.

In FIG. 3, processing begins at start 302 and continues along line 304 to initialization processes 306. Initialization processes 306 include initializing the service demands of BG jobs at 308, initializing the FG response time without BG jobs at 310, initializing the slowdown of FG jobs at 312 and initializing the CDH of idle times at 314. After completion of initialization processes 306, processing continues along line 316 to process 318 which estimates $E_k$. After completion of process 318, processing continues along line 320 to process 322 which calculates E. After completion of process 322, processing continues along line 324 to End 326.

Estimation of the (IW, $T_E$) Tuple

The transition from E to the tuple (IW, $T_E$) is done using the cumulative CDH (continuous data histogram) of idle intervals lengths. As shown in FIG. 1C and mentioned in the previous subsection, once E is determined, the tuple (IW, $T_E$) is computed by evaluating all ($IW^o$, $T_E^o$) choices obtained via scanning the entire spectrum of the cumulative CDH values, i.e., from 0 to 1, for intervals of length E, where o is an index that enumerates these choices. Given that the CDH is a list of (T, P, C) tuples, we start from the ordered list of C-values, where the intervals of length E are identified.

The algorithm disclosed here chooses the "best-performing" (IW, $T_E$) tuple among all available choices with respect to foreground performance degradation. Determining factors on the "best-performing" tuple are the amount of background work to be completed and its response time requirements. The chosen tuple is not the optimal one because the state space of all possible (IW, $T_E$) is not searched exhaustively.

The larger the value of E the smaller the number of ($IW^o$, $T_E^o$) choices among which the algorithm has to select the "best-performing" one. This means that if $E \geq 1$ then there is only one possibility which gives no restriction on how many busy periods are delayed. Also the finer the CDH representation (i.e., small bin lengths) the more choices available.

The $o^{th}$ choice is considered to select an interval of length E in the list of C-values of the constructed CDH. The beginning and the end of this interval are denoted as $C_{Begin}^o$ and $C_{End}^o$, respectively. The difference $C_{End}^o - C_{Begin}^o$ is equal to E (within the accuracy of the histogram's bin length). $T_{Begin}^o$ and $T_{End}^o$ are the T-values from the CDH tuples with $C_{Begin}^o$ and $C_{End}^o$ as C-values, respectively.

Determining the $T_{Begin}^o$ and $T_{End}^o$ values determines the $o^{th}$ choice for the ($IW^o$, $T_E^o$) tuple as follows:

$IW^o = T_{Begin}^o$ and $T_E^o = T_{End}^o - T_{Begin}^o$

Equation 7

Figure 4:
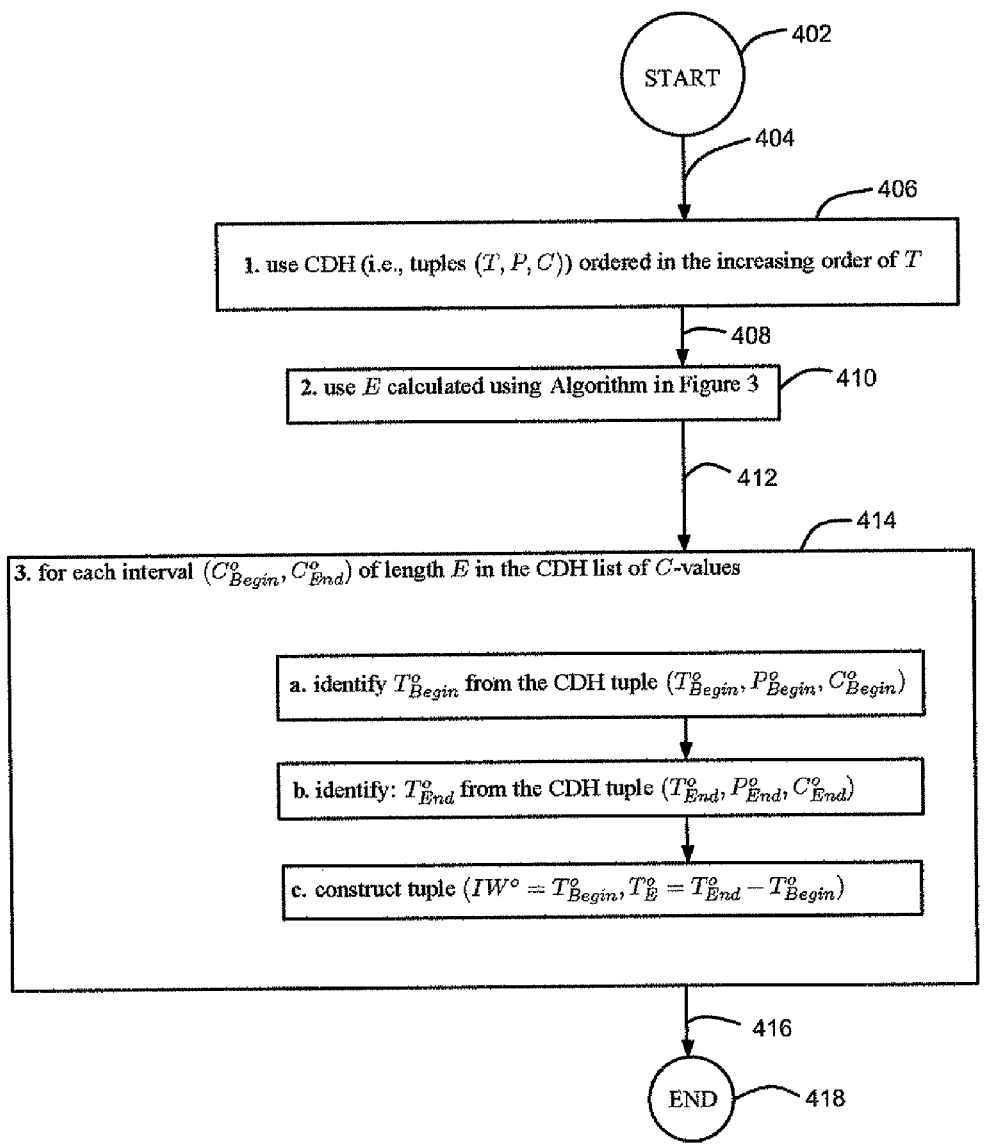
FIG. 4 illustrates an algorithm that generates $(IW^o, T_E^o)$ tuples.

The algorithm that describes how to generate all possible ($IW^o$, $T_E^o$) tuples is shown in FIG. 4. In FIG. 4, processing begins at Start 402 and continues along line 404 to process 406. At process 406, CDH tuples are ordered in increasing order of T. After completion of process 406, processing continues along line 408 to process 410. At process 410, E is calculated using an algorithm such as the algorithm illustrated in FIG. 3. After completion of process 410, processing continues along line 412 to process 414. At process 414, for each interval of length E in the CDH list of C-values, $T_{Begin}^o$ is identified from the CDH tuple, $T_{End}^o$ is identified from the CDH tuple, and a tuple $IW^o$ is constructed. After completion of process 414, processing continues along line 416 to End 418.

Adjustment of E to Allow Servicing of at Least a Background Task

Once all ($IW^o$, $T_E^o$) tuples are identified, a checked is made that all $T_E^o$ are shorter than the average background service time $S_{BG}$. If that is the case, then serving one background task per idle period larger than $IW^0$ will cause more delays in the foreground tasks than desired. In this case, the approach is to increase E to a new value $E_{new}$, such that at least one $T_E^o \geq S_{BG}$. The transition from E to $E_{new}$ is done with small increments (for example 0.05). Because $E_{new} > E$ then not all idle intervals longer than $IW^0$ will be used. Instead only $E/E_{new}$ of them will be used to serve a background task. This case is captured in the algorithm of FIG. 5.

Figure 5:
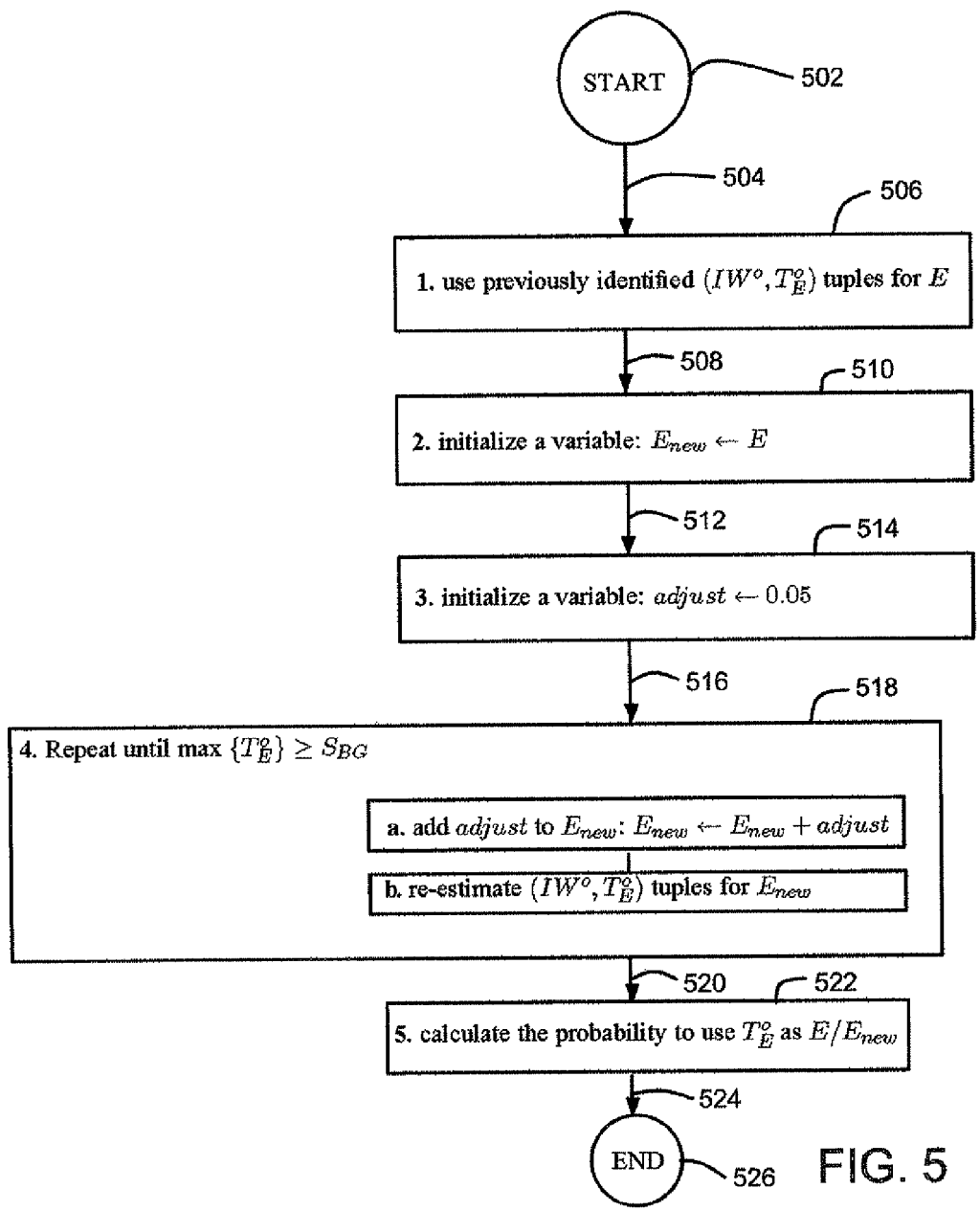
FIG. 5 illustrates adjusting E to fit an average background job service time $S_{BG}$.

FIG. 5 illustrates adjustment of E to fit the average background job service time. $S_{BG}$. In FIG. 5, processing begins at Start 502 and continues along line 504 to process 506. At process 506, previously identified tuples are used for E. After completion of process 506, processing continues along line 508 to process 510. At process 510, initialization of a variable Enew ← E is completed. After completion of process 510, processing continues along line 512 to process 514. At process 514, initialization of a variable adjust ← 0.05 is completed. The variable adjust increment can be 0.05 as illustrated, or another numerical value. After completion of process 514, processing continues along line 516 to process 518.

At process 518, processes a. and b. are repeated iteratively until max $\{T_E^o\} \geq S_{BG}$. Process a. comprises adding adjust to $E_{new}$: $E_{new}$ ← $E_{new}$+adjust. Process b. comprises re-estimation of $(IW^0, T_E^o)$ tuples for $E_{new}$. After completion of process 518, processing continues along line 520 to process 522.

At process 522, a probability of using $T_E^o$ as $E/E_{new}$ is calculated. After completion of process 522, processing continues along line 524 to End 526.

Work Estimation for Each Setting ($IW^0$, $T_E^o$)

Once all the choices $(IW^0, T_E^o)$ are defined, they are differentiated based on the amount of background work $W^0$ that the system can accomplish by idle waiting $IW^0$ and serving only for $T_E^o$ units of time. Here the amount of work $W^0$ is measured in units of time. Even if a number of jobs were selected as a metric, qualitatively the amount is equivalent, because only the average service time is used for one background task $S_{BG}$, in the disclosed approach. The amount of work $W^0$ that is completed using the $(IW^0, T_E^o)$ settings is estimated by following observations.

All idle intervals longer than $T_{End}^o$, have the effective time to service background tasks of $T_E^o$ time units. This situation happens for only $1-C_{End}^o$ of all idle intervals available in the system.

For idle intervals longer than $T_{Begin}^o$ but shorter than $T_{End}^o$ there will be some background work completed but the completed work is less than for intervals longer than $T_E^o$. To estimate the effective working time in these cases, the interval $T_{End}^o - T_{Begin}^o$ is partitioned in subintervals of length $S_{BG}$. By assuming that there are R such subintervals, it is estimated that for the $r^{th}$ subinterval, r background tasks are completed or $r \times S_{BG}$ units of time are used to serve background tasks. Because for idle intervals between $T_{Begin}^o$ and $T_{End}^0$, it is allowed to delay the incoming foreground busy period by as much as $S_{BG}$, the rth subinterval serves r and not (r-1) background tasks. For each subinterval the probability of occurrence is $C_r^o - C_{r-1}^o$.

For all idle intervals shorter than $T_{Begin}^o$ no work is done at all. This happens for $C_{Begin}^o$ times.

The effective background work that is completed in the system is shown in Equation 8.

$$W^o = T_E^o * (1 - C_{End}^o) + \sum_{r=1}^{R}(T_r^o - T_{r-1}^o)*(C_r^o - C_{r-1}^o),$$ Equation 8 where $T_r^o = T_{Begin}^o$ for r=0 and $T_r^o = T_{Begin}^o + r*S_{BG}$ for $1 \leq r \leq R$. The upper limit R for the index r is such that $T_r^o - T_{Begin}^o \leq T_E^o$.

All $(IW0, T_E^o)$ tuples are ordered based on their effective work $W^0$. The "best performing" one is chosen based on the characteristics of background tasks, such as the amount of work to be completed (infinite or finite) and requirements for buffer space. In the following subsections, it is presented how the tuple $(IW, T_E)$ is chosen.

Figure 6:
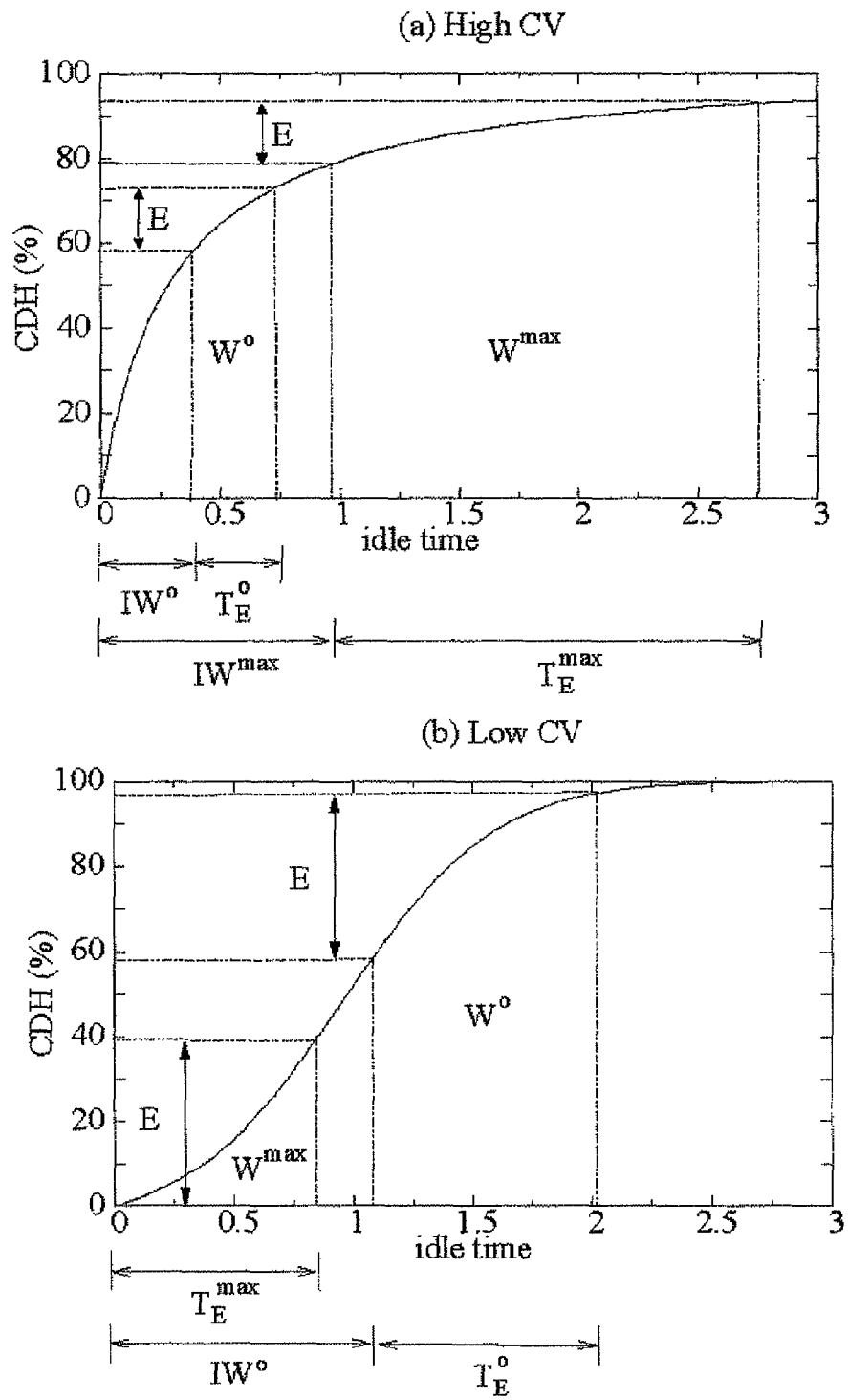
FIG. 6 illustrates multiple choices for the tuple $(IW^o, T_E^o)$ when idle intervals have (a) high variability and (b) low variability.

FIG. 6 shows how different choices of intervals of length E in the list of the CDH C-values translate to different $(IW^0, T_E^o)$ tuples. In particular we want to stress the differences in the $(IW^0, T_E^o)$ values resulting from different shapes of the CDH (like the one with high variability on the left plot and the one with low variability in the right plot of FIG. 6). For example if E is chosen such that $IW^0$ is small then for high variability idle times the corresponding $T_E^o$ is short (and consecutively work to be completed will be small as well) while for low variability idle times that seem to provide the longest $T_E^o$. Similarly choosing a large $IW^0$ will be effective only for high variability idle times but not for the low variability ones. FIG. 6 illustrates multiple choices for the tuple $(IW^0, T_E^o)$ when idle intervals are with (a) high variability and (b) low variability.

Infinite Background Work

If the amount of background work is infinite (or very large in quantity) the goal is to complete as much as possible from it. Hence, the choice of the $(IW, T_E)$ tuple is the one that facilitates completing the largest amount of work $W^0$ as captured in Equation 9, where $T_{Begin}$, $T_{End}$ and $W^{max}$ represent the corresponding values of the selected $(IW, T_E)$ tuple.

$T_E = \{T_{End} - T_{Begin} | W^{max} = \max\{W^o \text{ for } \forall o\}\}$ and $IW = T_{begin}$  Equation 9

Figure 7:
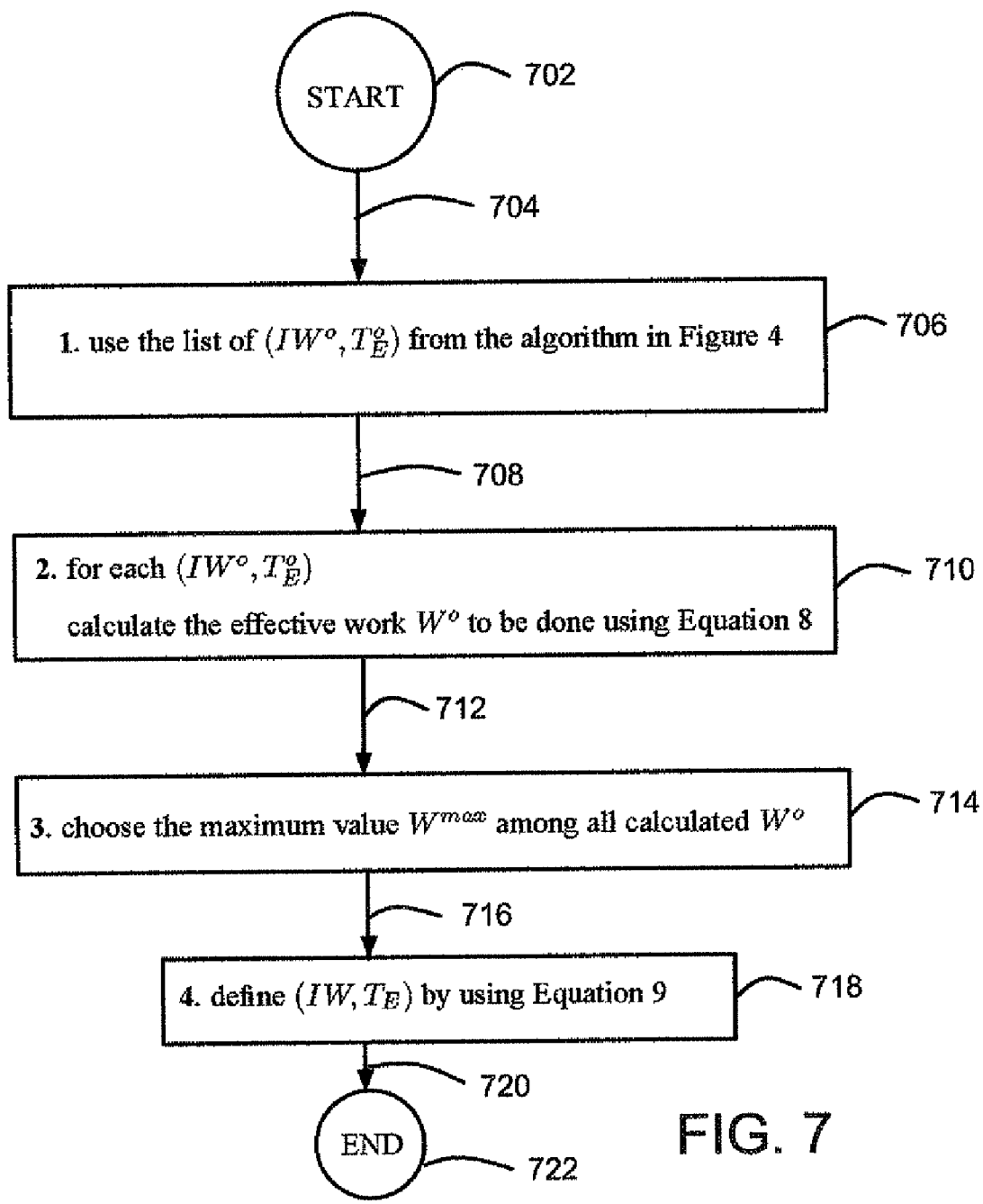
FIG. 7 illustrates defining a tuple $(IW, T_E)$ for an infinite amount of background work.

The algorithm that captures how to handle the infinite amount of work by choosing the tuple $(IW, T_E)$ that allows for the maximum amount of work to be completed is given in FIG. 7.

In FIG. 7, processing begins at Start 702 and continues along line 704 to process 706. At process 706, the list of $(IW^0, T_E^o)$ from the algorithm in FIG. 4 is selected for use. After completion of process 706, processing continues along line 708 to process 710. At process 710, for each $(IW^0, T_E^o)$, the effective work $W^0$ to be done is calculated using Equation 8. After completion of process 710, processing continues along line 712 to process 714. FIG. 7 illustrates defining a tuple $(IW, T_E)$ for an infinite amount of background work.

At process 714, a maximum value $W^{max}$ is chosen from all of the calculated $W^0$ values. After completion of process 714, processing continues along line 716 to process 718. At process 718, $(IW, T_E)$ are defined by using Equation 9. After completion of process 718, processing continues along line 720 to End 722.

Finite Background Work without Buffer Requirements

The finite background work to be completed is $W_F$ and the maximum amount of work that can be accommodated by the system's idleness is $W^{max}$. The work is measured in units of time which means that $W_F$ and $W^{max}$ represent how many units of time should be used in average every idle period to service background tasks. However there is a one to one correspondence between the number of background tasks and the time required to serve them. Hence the average number of background tasks generated every foreground busy period is estimated, denoted by M, and relates to $W_F$ as $W_F = M*S_{BG}$.

The estimations of M, $W_F$ and $W^{max}$ are average metrics, which means that there will be idle periods that will have more background work to serve and even some that may not serve any background tasks.

As mentioned above, if $W^{max} \leq W_F$, then this case is the same as the one for infinite background work. However, if Wmax>$W_F$, then we give more consideration on what tuple (IW$^0$, $T_E^o$) should be selected such that not only the finite background work is served but also with fast response times. In particular, for high variability idle times (as depicted in FIG. 6(a)) as IW increases more background work can be completed. However this comes to a cost on background response time because long IW causes background work to be served in only few large idle intervals which arrive less frequently when compared with shorter ones. Consequently, the goal is to select the tuple (IW$^0$, $T_E^o$) such that the corresponding W$^0$ can accommodate $W_F$ (i.e., W$^0$>$W_F$) but has the smallest IW$^0$.

To select the (IW, $T_E$) tuple, the list of all (IW$^0$, $T_E^o$) is sorted in the increasing order of $T_{Begin}^o$. Depending on the variability in the idle times distribution, this sorting will result in the corresponding W$^0$ be sorted in the increasing order (for the high CV case) and decreasing order (for the low CV case). If the W$^{max}$ is reached by setting for o=0 then the choice is straightforward: IW=$T_{Begin}^o$ and $T_E = T_{End}^o - T_{Begin}^o$. If the order of W$^0$ is increasing then the tuple (IW, $T_E$) is chosen by setting o=short such that corresponding amount of effective work is $W^{short} = 1.5*W_F$. The resulting (IW, $T_E$) tuple will be the (IW=$T_{Begin}^{short}$, Te=$T_{End}^{short} - T_{Begin}^{short}$). If $1.5*W_F > W^{max}$ the $W^{short} = W^{max}$.

Figure 8:
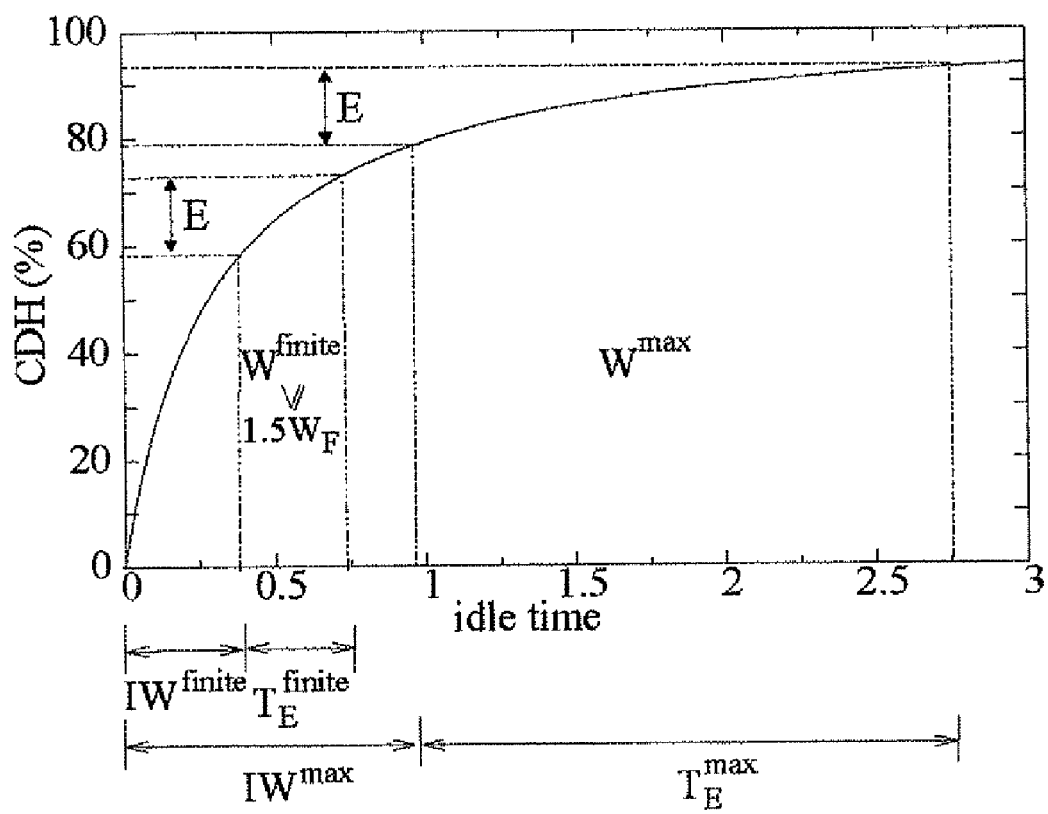
FIG. 8 illustrates a selection of an $(IW, T_E)$ tuple for a finite amount of work $W_F$ such that $W^o$ is greater than 1.5*WF.

The choice of the constant 1.5 to multiply $W_F$ is chosen to be more conservative. As mentioned before, only averages are worked with in the estimation. $W_F$ itself is an average. However if the system is under a burst, then the background work will accumulate. Although the condition $W_F = W^0$ guarantees that the work will be completed it does not guarantee it will be fast because of these bursty work arrivals. Consecutively the more deterministic the nature of the background work generation the smaller the constant need to be. The more variable the work is per busy period the larger this constant needs to be. Setting this constant to 1.5 seems to strike a good balance, however other values of constants can be used. This approach determines the (IW, $T_E$) tuple for finite background work without buffer requirements as shown schematically in FIG. 8. FIG. 8 illustrates a selection of the (IW, $T_E$) tuple for a finite amount of work $W_F$ such that W$^0$ is greater than $1.5*W_F$. A corresponding algorithm is shown in FIG. 9.

Figure 9:
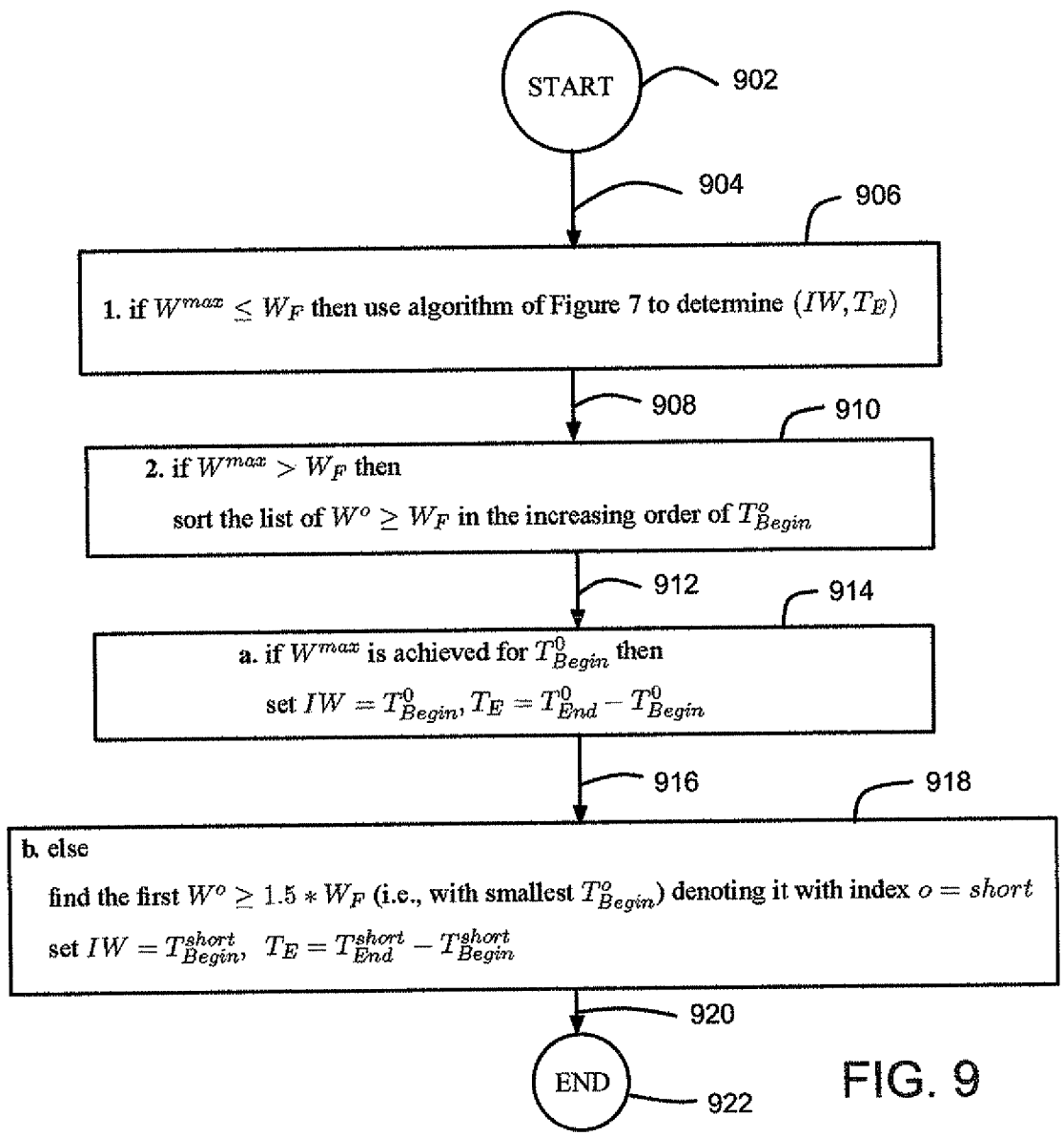
FIG. 9 illustrates an estimation of the $(IW, T_E)$ tuple when background work is finite without buffer requirements.

FIG. 9 illustrates an estimation of the (IW, $T_E$) tuple when background work is finite without buffer requirements. In FIG. 9, processing begins at Star 902 and continues along line 904 to process 906. In process 906, if $W^{max} \leq W_F$, then the algorithm of FIG. 7 is used to determine (IW, $T_E$). After completion of process 906, processing continues along line 908 to process 910. At process 910, if $W^{max} > W_F$, then the list of $W^0 \geq W_F$ is sorted in increasing of $T_{Begin}^o$. After completion of process 910, processing continues along line 912 to process 914.

At process 914, if $W^{max}$ is achieved for $T_{Begin}^o$, then IW=$T_{Begin}^o$, $T_E = T_{End}^o - T_{Begin}^o$ are sent. After completion of process 914, processing continues along line 916 to process 918. At process 918, if $W^{max}$ is not achieved for $T_{Begin}^o$, the first $W^0 \geq W_F$ (i.e. with smallest $T_{Begin}^o$) is found, denoting it with index o=short. IW=$T_{Begin}^{short}$, $T_{End}^{short} - T_{Begin}^{short}$ is set. After completion of process 918, processing continues along line 920 to End 922.

Finite Background Tasks with Buffer Requirements

If the background work has buffer requirements, i.e., the work is stored in some buffer space, then the scheduling of background tasks can be such that the background buffer is flushed as fast as possible, which is achieved if background task response time is reduced. Here, the way to define (IW, $T_E$) tuple is similar as in the previous subsection, but some more cases are added where IW can be reduced even further for faster background response times.

Again, assuming that the average background work accumulated every foreground busy period is M background tasks or $W_F = M*S_{BG}$ units of time. Also, assuming that the available buffer space is B (measured in the average number of background tasks it can hold).

A difference between finite background work without buffer requirements and finite background work with buffer requirements is that for the latter there will be cases when background tasks will be dropped because the buffer is full. Because all our decisions are based on the amount of background work that can be completed for any schedule (IW$^0$, $T_E^o$), it is desired for the accuracy of the algorithm to estimate how much work will be dropped so that (IW$^0$, $T_E^o$) is selected guided by the amount of work that will be actually served and not by the amount of generated background work.

There are two situations when a background task is dropped. First, of the number of background tasks that are generated in the $d^{th}$ busy period, if $M^d$ is larger than B, then B−$M^d$ background tasks will be dropped independently of the idleness available in the system. Second, if every idle period, on average, generates less background tasks than what the buffer can hold, but because of the idleness availability in the system only a portion of them is served, then the remaining tasks are dropped.

Figure 10:
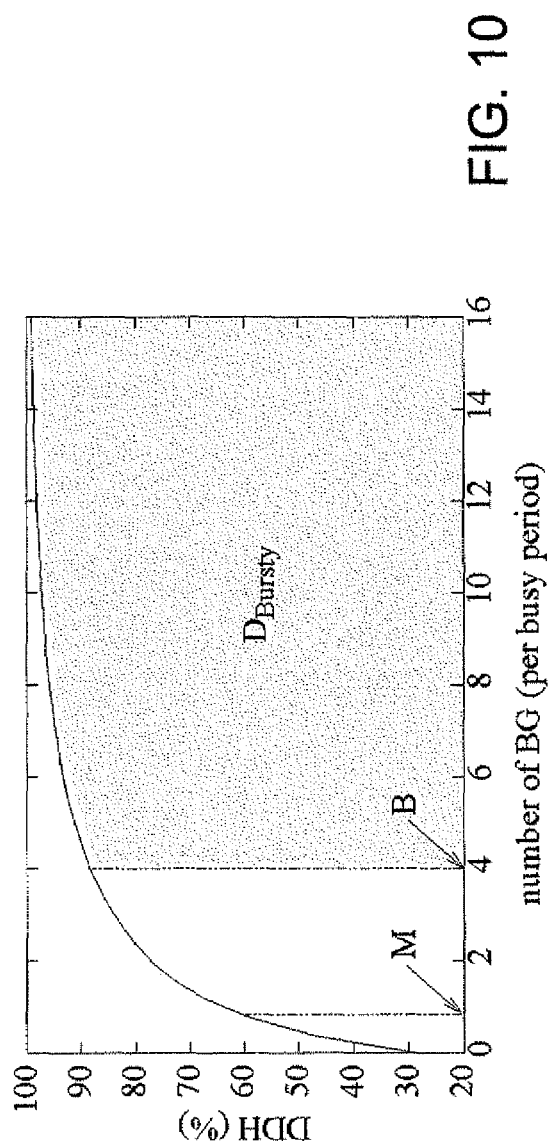
FIG. 10 illustrates dropped background tasks when generated background tasks are larger that the buffer size B.

To capture the first case, as shown FIG. 10, the number of generated background tasks are monitored every idle period and its discrete data histogram DDH is built using the same structure as the CDH of idle times. The DDH tuples are (M, P, C) where M represents background tasks arrivals in one busy period. For all busy periods that generate more than B background tasks, the excessive background tasks will be dropped. $M^d$ denotes a value from the list of M-values in this DDH. The number of background tasks $D_{Bursty}$ that will be dropped can be computed because one busy period generated more than B background tasks and the corresponding dropping rate $DR_{Bursty}$ using the P-values of the DDH is shown in Equation 10.

$$D_{Bursty} = \sum (M^d - B) * P[M^d], \forall\, M^d > B, \text{ and}$$

$$DR_{Bursty} = \frac{D_{Bursty}}{M}$$

Equation 10

Consequently, the correct average number of background tasks which need to be served every idle period and the corresponding amount of work are $$M' = M*(1 - DR_{Bursty}) \text{ and}$$

$$W'_F = M'*S_{BG}$$

Equation 11

FIG. 10 illustrates dropped background tasks due to generated background tasks that are larger that the buffer size B.

Figure 11:
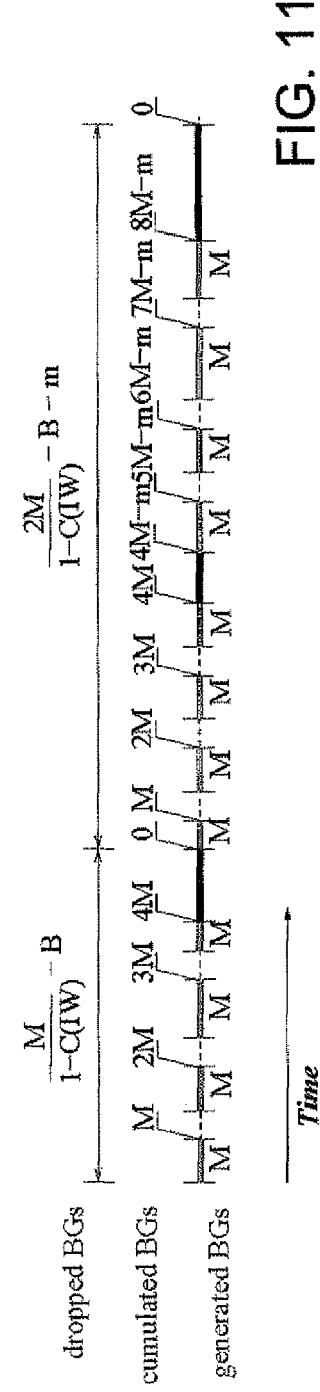
FIG. 11 illustrates BG tasks dropping due to the accumulation of more background tasks than the available buffer size B.

FIG. 11 illustrates BG tasks dropping due to the accumulation of more background tasks than the available buffer size B. Marked in gray are the foreground busy periods which bring in average M BG tasks each. The background tasks are scheduled for service every $1/(1/-C(IW))$ idle intervals (4 intervals in FIG. 11). Idle intervals shorter than IW are marked with dashed lines (—) while the idle intervals used to serve background jobs are marked with black.

A second type of background tasks dropping (i.e., dropping because accumulated outstanding background tasks exceed the available buffer space) happens mostly when the idle wait IW is non-zero (i.e., idle intervals have high variability) and not all idle intervals serve background tasks. In order to avoid dropping in these cases the buffer space should accommodate several times the number of background tasks generated in every busy period.

C(IW) represents the cumulative probability value for IW in the CDH of idle intervals. It follows that only $(1-C(IW))\%$ of idle intervals serve background tasks. On average this means that $M'/(1-C(IW))$ background jobs will be accumulated for $1/(1-C(IW))$ foreground busy periods. As shown in FIG. 11, if the accumulated background tasks exceed buffer capacity B, then on average $M'/(1-C(IW))-B$ background tasks will be dropped. Furthermore, among the remaining $(1-C(IW))\%$ of idle intervals, some are longer than IW but shorter than $IW+S_{BG}*\min(B, M'/(1-C(IW)))$ and will not flush the background queue.

Focusing on a set of $2*1/(1-C(IW))$ busy periods and estimate how accumulation of background tasks propagate through them, it is noted that more propagation levels, e.g., Constant$*1/(1-C(IW))$ busy periods with Constant>2 would produce more accurate estimation of the background dropping rate but the complexity will increase as well and instead a practical set of $2*1/(1-C(IW))$ busy periods was used. During these busy periods there has been only one chance to serve background tasks. If in that idle period there were served m tasks (where m<M'/(1−C(IW))) then after $2*1/(1-C(IW))$ busy periods the number of accumulated background tasks, $Cum^c$, will be larger than the expected $M'/(1-C(IW))$ and is given by Equation 12:

$$Cum^m = \frac{M'}{1-C(IW)} - m + \frac{M'}{1-C(IW)} - B \qquad \text{Equation 12}$$
$$= 2 * \frac{M'}{1-C(IW)} - m - B.$$

The maximum amount of work to be served in any idle period is B because there will never be more than B background tasks waiting for service at any time in the system. On average, the maximum number of background tasks that need to be served in an idle period longer than IW is $M'_{Less}=\min\{\lceil M'/(1-C(IW))\rceil, B\}$ where the brackets $\lceil\ \rceil$ denote the ceiling function. It follows that the number of jobs served in an idle period longer than IW is $1<m<M'_{Less}-1$ for some accumulation between idle times longer than IW to happen.

The cumulative probability from the idle times CDH to have an idle interval of length $IW+m*S_{BG}$ given that the idle interval is longer than IW can be written as $(C(m*S_{BG})-C((m-1)*S_{BG}))/(1-C(IW))$. The average number of background tasks to be dropped every $1/1(1-C(IW))$ busy periods, because of accumulation of outstanding background tasks, is calculated using Equation 13 and the corresponding drop rate using Equation 14.

$$D_{Cum} = \sum_{m=1}^{M'_{Less}-1} \frac{C(m*S_{BG}) - C((m-1)*S_{BG})}{1-C(IW)} * Cum^m + \qquad \text{Equation 13}$$
$$\frac{1-C(M'_{Less})*S_{BG}}{1-C(IW)} * \left(\frac{M'}{1-C(IW)} - B\right)$$

$$DR_{Cum} = \frac{D_{Cum} \Big/ \frac{1}{1-C(IW)}}{M'} \qquad \text{Equation 14}$$
$$= \frac{D_{Cum} * (1-C(IW))}{M'}$$

Considering both cases for dropping a background task because of limited buffer space, allows for the estimation of the reduced background work for which the algorithm should make a decision on how to schedule.

$$M''=M'*(1-DR_{Cum}) \text{ and}$$

$$W'''_F = M''*S_{BG} \qquad \text{Equation 15}$$

Figure 12:
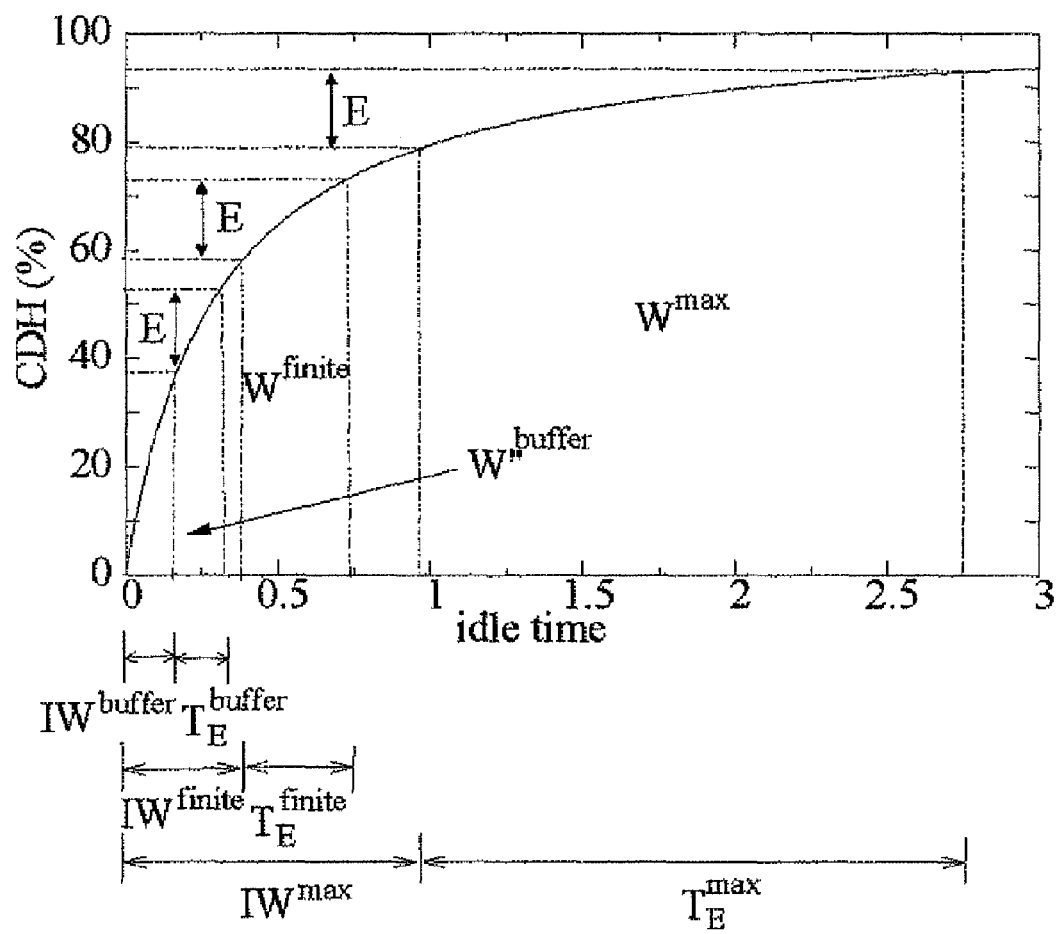
FIG. 12 illustrates selection of an $(IW, T_E)$ tuple such that $1.25*W''_F$ work can be completed when the background work is finite with buffer requirements.

The (IW, $T_E$) tuple is chosen such that the work to be completed in background is 1.25 times greater than $W'''_F$, as shown in FIG. 12. The purpose of the 1.25 constant is the same as the 1.5 constant in the case of scheduling finite background work without buffer requirements. Here a smaller constant is used since most of the bursty cases are eliminated with the first case of background task dropping.

FIG. 12 illustrates selection of an (IW, $T_E$) tuple such that $1.25*W'''_F$ work can be completed when the background work is finite with buffer requirements.

Figure 13:
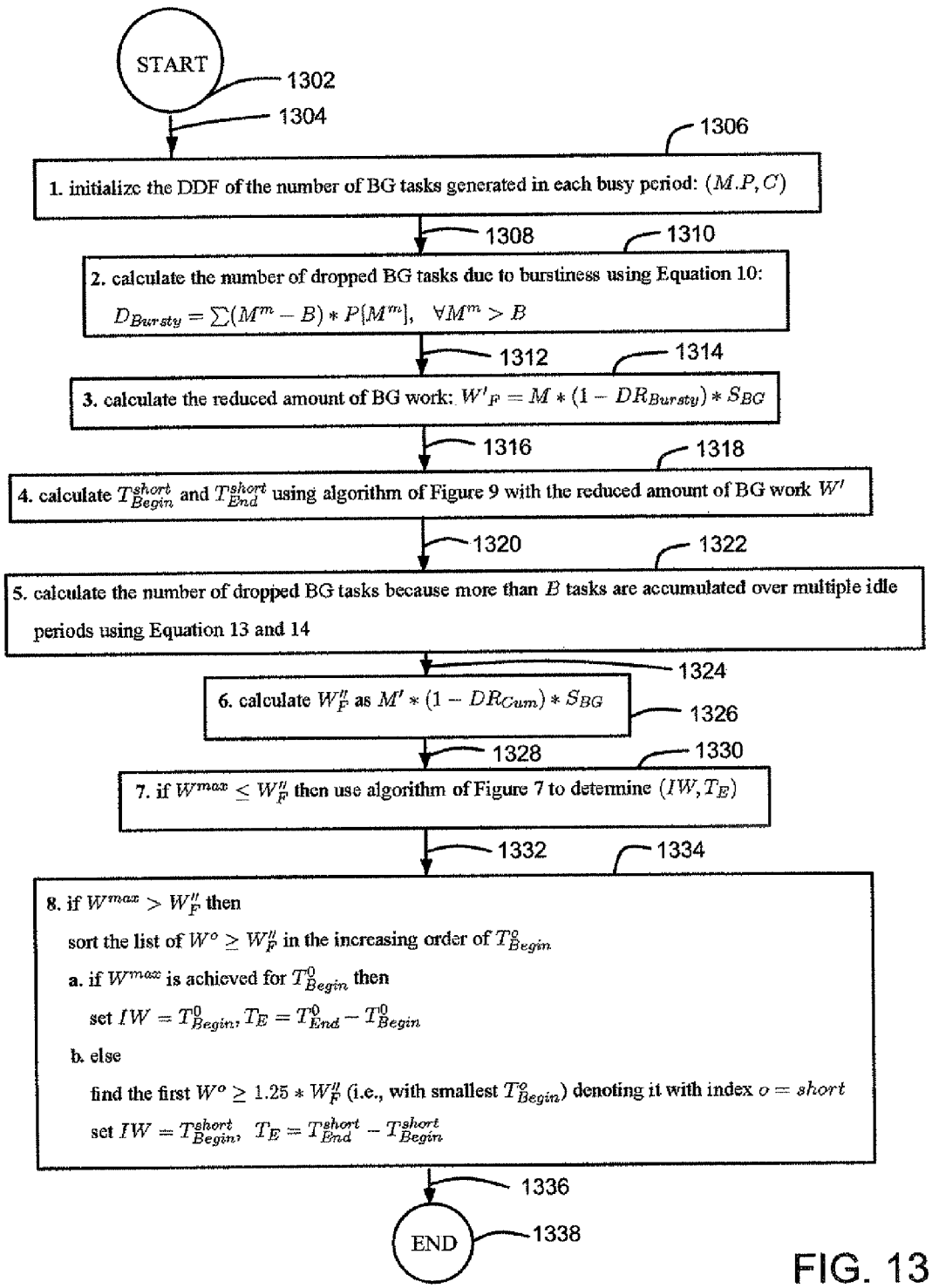
FIG. 13 illustrates an estimation of the (IW, TE) tuple when background work is finite with buffer requirements.

The algorithm that captures the case of finite background work with buffer requirements is presented in FIG. 13.

In FIG. 13, processing begins at Start 1302 and continues along line 1304 to process 1306. After completion of process 1306, processing continues along line 1308 to process 1310. After completion of process 1310, processing continues along line 1312 to process 1314. After completion of process 1314, processing continues along line 1316 to process 1318. After completion of process 1318, processing continues along 1320 to process 1322. After completion of process 1322, processing continues along line 1324 to process 1326. After completion of process 1326, processing continues along line 1328 to process 1330. After completion of process 1330, processing continues along line 1332 to process 1334. After completion of process 1334, processing continues along line 1336 to End 1338. Various processes in FIG. 13 are as described in FIG. 13. FIG. 13 illustrates an estimation of the (IW, TE) tuple when background work is finite with buffer requirements.

Algorithm

Figure 14:
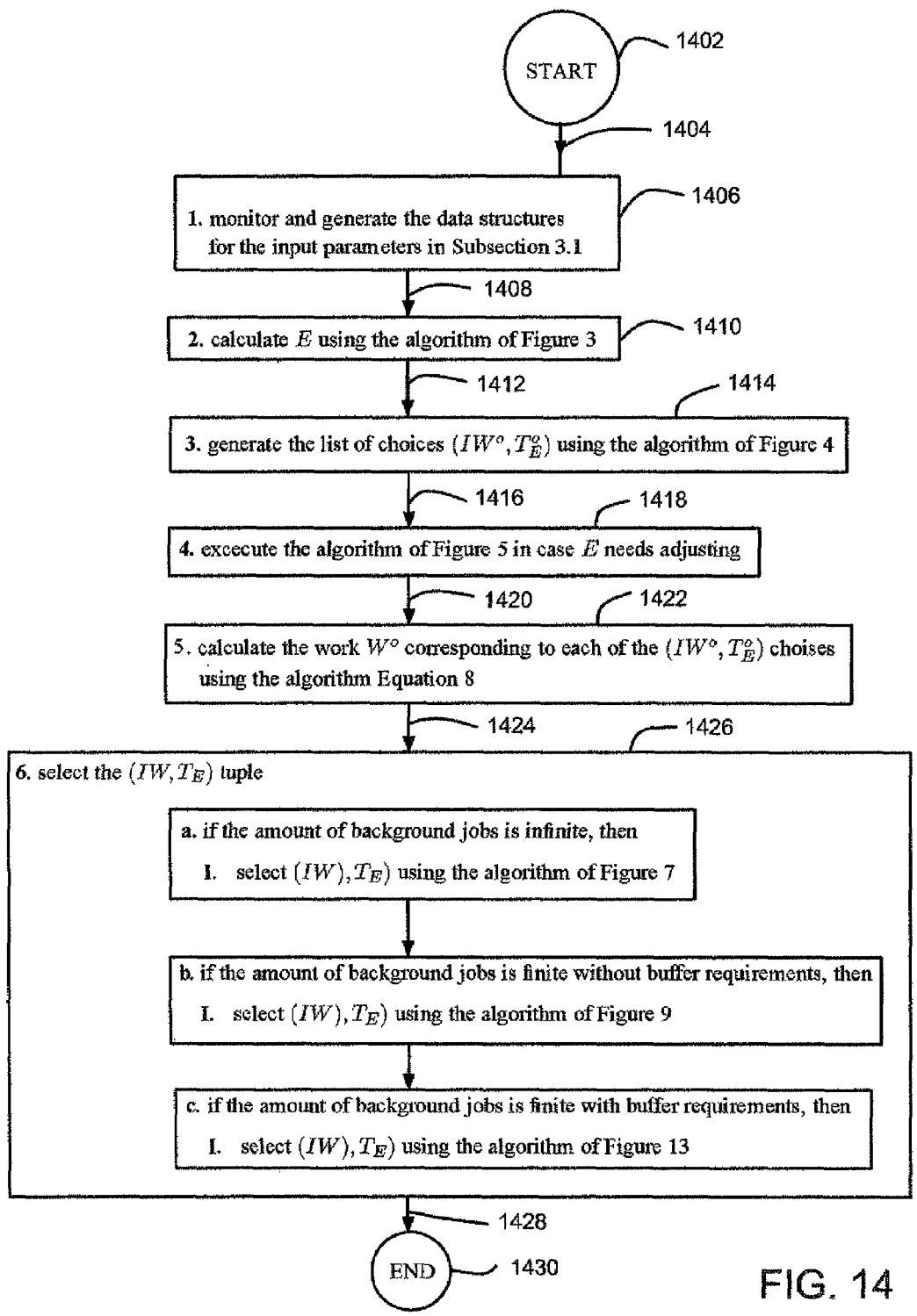
FIG. 14 combines smaller algorithms explained above to define the algorithm that defines $(IW, T_E)$ for scheduling background tasks.

In FIG. 14, processing begins at Start 1402 and continues along line 1404 to process 1406. After completion of process 1406, processing continues along line 1408 to process 1410. After completion of process 1410, processing continues along line 1412 to process 1414. After completion of process 1414, processing continues along line 1416 to process 1418. After completion of process 1418, processing continues along 1420 to process 1422. After completion of process 1422, processing continues along line 1424 to process 1426.

After completion of process 1426, processing continues along line 1428 to End 1430. Various processes in FIG. 14 are as described in FIG. 14.

FIG. 14 combines all the smaller algorithms explained in the previous subsection to define the algorithm that defines (IW, $T_E$) for scheduling background tasks with the guarantee that the foreground performance will degrade no more than a predefined threshold.

Analysis and Evaluation

Trace-driven simulations analyze the performance of the algorithm in FIG. 14. The traces are generated synthetically (i.e. with 1 million entries) to allow evaluation of a range of characteristics. Because the focus of the algorithm is on when to start and stop scheduling of background tasks such that the foreground performance is contained within pre-defined thresholds, the simulation focuses on capturing correctly the interaction between foreground and background busy periods but not how work is completed inside them. Thus, there is a focus to have flexibility in the arrival process of foreground requests such that first, different system utilization is obtained, and second different characteristics in the distribution of idle times are obtained.

Foreground inter-arrival times from an Erlang distribution were generated, resulting in idle intervals of low variability, and from a log normal distribution, resulting in idle periods with high variability. For both cases, the mean inter-arrival times are adjusted such that the system utilization due to foreground jobs only, is equal to 10%, 30%, and 70%, representing a system under low, medium, and high foreground load, respectively. Both foreground and background jobs have the same mean service time (i.e., 10 ms), which are exponentially distributed. The assumption is that the preemption granularity is the average service of a single disk request. This is the reason for assuming both background and foreground tasks have the same service time distribution. If background tasks are longer but the preemption level remains the same then their modeling can accurately be approximated by our assumption, since the focus is completion of background tasks without violating foreground performance targets, which in our experiments is set to 7%. The reported results are within 98% confidence intervals.

Three types of background work are modeled, i.e., infinite work, finite work without buffer requirements, and finite work with finite buffer requirements. In the case of infinite work, the background queue is always with outstanding requests. In the case of the finite background work, it is assumed that the work is generated as a portion of the foreground traffic (e.g., many background features in disk drives depend on the amount of foreground WRITE traffic). For each case of system utilization and idle time characteristic, the background work is generated to be 10%, 30%, and 60% of the foreground work. For the finite background work with buffer requirements, systems with various buffer sizes are also tested, e.g., a maximum number of outstanding background tasks to be 4, 16, and 64. Here, we only present the results for the system with buffer size equal to 4. The results for the other buffer sizes are qualitatively the same.

TABLE 3

| util | IW | $T_E$ | FG slowdown | BG completion |
|---|---|---|---|---|
| 10% | 0.0 | 45.3 | 10.9 (8.9%) | 4.5M/1M |
| 30% | 0.0 | 10.6 | 11.85 (10.7%) | 0.56M/1M |
| 70% | 0.0 | 10.4 | 21.5 (6.3%) | 0.07M/1M |

Table 3 shows overall system performance for infinite background jobs when the idle intervals have low variability. Three foreground system utilizations are evaluated, i.e., 10%, 30% and 70%. The DD of Equation 6 is set at 0.07.

The metrics evaluated in the simulations are: (a) the average response time of foreground jobs with and without background tasks; (b) the slowdown of foreground jobs due to background tasks; (c) the number of completed background jobs; (d) the average completion time of background jobs which is the time interval between the generation of a background job and the completion of that particular background task (this metric is monitored only for finite background work); (e) the overall (foreground+background) system utilization; and (f) the drop rate of the background jobs, i.e., the ratio of the number of dropped background tasks to the number of generated background tasks (this metric is monitored only for finite background work with buffer requirements).

Infinite Background Work

The results of simulations with infinite amount of background work (e.g. background media scan) are shown in Table 4 and Table 3. The performance target for foreground is set to be at most 7% lower than without background tasks, i.e., DD=0.07. As mentioned in the previous section, if the idle times distribution has low variability, idle waiting is not effective. Thus IW is set to be equal to 0 (see the second column in Table 3) for the three different foreground system utilizations that are evaluated (see the first column in Table 3). Because for idle times with low variability the majority of idle periods is with a similar length, the amount of time to serve background jobs is short (see the third column in Table 3).

As the variability in the idle times distribution increases, non-zero idle waiting becomes necessary to maintain foreground performance targets (see IW values in Table 4). However the length of the background busy period (i.e., TE) now becomes longer than under the low variability case of Table 3 (see the third column of Table 4). This means that if idle times are variable, the system should idle wait to avoid using the very short idle intervals, but when a long idle interval arrives then a lot of background work can be accomplished.

TABLE 4

| util | IW | $T_E$ | FG slowdown | BG completion |
|---|---|---|---|---|
| 10% | 330.2 | 4817.8 | 18.2 (9.7%) | 3.8M/1M |
| 30% | 138.0 | 3269.2 | 34.2 (9.7%) | 1.2M/1M |
| 70% | 0.0 | 51694.8 | 182.1 (5.7%) | 0.42M/1M |

Table 4 illustrates overall system performance for infinite background jobs when the idle intervals are with high variability. Three foreground system utilizations are evaluated, i.e., 10%, 30% and 70%. The DD of Equation 6 is set to 0.07.

TABLE 5

| util | IW | $T_E$ | FG slowdown | BG completion |
|---|---|---|---|---|
| 10% | 0.0 | 41.1 | 10.6 (5.9%) | 4.1M/1M |
| 30% | 0.0 | 12.1 | 11.3 (5.6%) | 0.33M/1M |
| 70% | 0.0 | 10.8 | 21.1 (4.4%) | 0.05M/1M |

Table 5 illustrates overall system performance for infinite background jobs when the idle intervals are with low variability. Three foreground system utilizations are evaluated, i.e., 10%, 30%, and 70%. The DD in Equation 6 is set to 0.05.

Both Tables 3 and 4 indicate that the critical cases when serving background jobs are under low and medium utilization rather than under high utilization, because in the latter case foreground jobs wait in the foreground queue for other foreground jobs to be served and the short wait because of background tasks does not effect their response time. For example the estimated E is greater than 1 for utilization of 70%, in the case of highly variable idle times (captured in Table 4), which means that the system can starts serving background jobs immediately when it becomes idle and can continue to serve them until the next foreground job arrives. An E=1 puts no restriction on the number of foreground busy periods delayed from background tasks while the foreground performance is kept within the pre-defined limits.

However, for low to medium utilization in the system, the foreground performance is more sensitive to any short delay caused by background tasks. In those cases for both high and low variability idle times, the foreground performance degrades between 30% and 40% more than the desired 7%, bringing the performance degradation to as high as 10% (see the fourth column of Tables 3 and 4). The reason behind it is the average values that we use in the algorithm such as the average service demands for background and background tasks, the average response time of foreground tasks without background work.

In order to account for these inconsistencies, one can put a more stringent value for DD and estimate E based on that. For example if DD is reduced to 0.05 although the target is 0.07 the estimated E will change and consecutively the overall results. The results of such experiments in Tables 5 and 6.

TABLE 6

| util | IW | $T_E$ | FG slowdown | BG completion |
|---|---|---|---|---|
| 10% | 461.3 | 6034.0 | 17.7 (6.6%) | 3.4M/1M |
| 30% | 195.6 | 4268.6 | 33.5 (7.4%) | 1.0M/1M |
| 70% | 14.9 | 1500.4 | 180.5 (4.8%) | 0.34M/1M |

Table 6 illustrates overall system performance for infinite background jobs when the idle intervals are with high variability. Three foreground system utilizations are evaluate, i.e., 10%, 30%, and 70%. The DD in Equation 6 is set at 0.05.

TABLE 7

| util | por-tion | IW | $T_E$ | FG slowdown | BG resp | BG completion |
|---|---|---|---|---|---|---|
| 10% | 10% | 0.0 | 45.3 | 10.008 (0.0%) | 10.0 | 0.10M/1M |
| | 30% | 0.0 | 45.3 | 10.01 (0.0%) | 10.0 | 0.30M/1M |
| | 60% | 0.0 | 45.3 | 10.03 (0.2%) | 10.0 | 0.60M/1M |
| 30% | 10% | 0.0 | 10.5 | 10.9 (1.8%) | 42.0 | 0.10M/1M |
| | 30% | 0.0 | 10.5 | 11.3 (5.6%) | 69.1 | 0.30M/1M |
| | 60% | 0.0 | 10.5 | 11.8 (10.2%) | 1246530.1 | 0.56M/1M |
| 70% | 10% | 0.0 | 10.4 | 21.5 (6.3%) | 1858044.4 | 0.07M/1M |
| | 30% | 0.0 | 10.4 | 21.5 (6.3%) | 5377484.3 | 0.07M/1M |
| | 60% | 0.0 | 10.4 | 21.5 (6.3%) | 6264516.3 | 0.07M/1M |

Table 7 illustrates overall system performance for finite background jobs without buffer requirements when the idle intervals are with low variability. Three foreground utilizations are evaluated, i.e., 10%, 30%, and 70%. Three background works are evaluated: 10%, 30%, and 60% of the foreground work.

Compared to results of Tables 4 and 3, the foreground performance degradation is maintained within the target. However, as expected, this comes at a cost for the number of background tasks completed (see the last column in Tables 5 and 6 and compare it with the last column of Tables 4 and 3).

Finite Background Work without Buffer Requirements

Results with finite background work without any buffer requirements are shown in Table 7 and 8, where the idle intervals are with low variability and high variability, respectively. Generally, in the case of finite background work, the performance degradation (fifth column in the tables) is contained within the predefined target easily because often the length of background busy periods $T_E$ is long enough to accommodate the finite amount of work requiring service.

TABLE 8

| util | por-tion | IW | $T_E$ | FG slowdown | BG resp | BG completion |
|---|---|---|---|---|---|---|
| 10% | 10% | 20.9 | 10.4 | 16.8 (1.2%) | 130.4 | 0.10M/1M |
| | 30% | 41.9 | 20.9 | 17.2 (3.6%) | 519.6 | 0.30M/1M |
| | 60% | 104.8 | 83.8 | 17.4 (4.8%) | 776.1 | 0.60M/1M |
| 30% | 10% | 3.4 | 10.4 | 32.4 (3.9%) | 363.3 | 0.10M/1M |
| | 30% | 64.6 | 103.0 | 33.0 (5.8%) | 789.8 | 0.30M/1M |
| | 60% | 122.3 | 684.9 | 33.5 (7.4%) | 2212.9 | 0.60M/1M |
| 70% | 10% | 0.0 | 51694.8 | 175.8 (2.1%) | 1540.1 | 0.10M/1M |
| | 30% | 0.0 | 51694.8 | 180.7 (4.9%) | 6738.0 | 0.30M/1M |
| | 60% | 0.0 | 51694.8 | 182.1 (5.7%) | 2281001.6 | 0.42M/1M |

In Table 8, overall system performance for finite jobs without buffer requirement when the idle intervals are with high variability are shown. Three foreground system utilizations are evaluated, i.e., 10%, 30%, and 70%. Three background work levels are evaluated: 10%, 30% and 60% of the foreground work.

For idle times with low variability, the amount of idle wait is again IW=0 and the length of background busy period is similar to the case of finite amount of work. That is because for low variability idle times, the infinite work case results in the same selection as in the finite work case. Differences are observed only in the case of high variability idle periods. As described above, to reduce the background tasks response time, the algorithm finds the smallest IW that can complete the required background work. As a result, in Table 8 the IW and the $T_E$ are much smaller than in the high variability cases for infinite background work (in Tables 4 and 6). The exception is the case with high utilization where as discussed above, the amount of idle wait is zero because there is no limitation in the number of foreground busy periods that are delayed.

The last columns of Tables 7 and 8 give the amount of work completed for the duration of the simulation. If that number does not correspond to the respective portion of the workload (i.e., 10%, 30%, and 60%), it means that the remaining work has been completed and consecutively the background work is being queued without the queue being flushed. Because there are no buffer requirements then this work can be queued but will experience very long response times. The fact that not the entire finite work can complete indicates that there is more work to be done that idleness in the system (when foreground performance targets are in place). Under high variability idle periods, the amount of finite work completed is more than under low variability idle periods. For finite amount of work without any buffer requirements, the system will benefit more from some long idle periods rather than many short ones.

TABLE 9

| util | portion | IW | $T_E$ | FG slowdown | BG resp | BG drop |
|---|---|---|---|---|---|---|
| 10% | 10% | 0.0 | 45.3 | 10.008 (0.0%) | 10.0 | 0.0 |
| | 30% | 0.0 | 45.3 | 10.01 (0.0%) | 10.0 | 0.0 |
| | 60% | 0.0 | 45.3 | 10.03 (0.2%) | 10.0 | 0.0 |

TABLE 9-continued

| util | portion | IW  | $T_E$ | FG slowdown | BG resp | BG drop |
|------|---------|-----|-------|-------------|---------|---------|
| 30%  | 10%     | 0.0 | 10.5  | 10.9 (1.8%) | 42.1    | 0.0     |
|      | 30%     | 0.0 | 10.5  | 11.3 (5.6%) | 64.9    | 0.0     |
|      | 60%     | 0.0 | 10.5  | 11.7 (9.3%) | 137.5   | 0.14    |
| 70%  | 10%     | 0.0 | 10.4  | 21.4 (5.8%) | 550.0   | 0.33    |
|      | 30%     | 0.0 | 10.4  | 21.6 (6.8%) | 712.4   | 0.75    |
|      | 60%     | 0.0 | 10.4  | 21.6 (6.8%) | 749.8   | 0.87    |

In Table 9, overall system performance for finite background jobs with buffer requirements when idle intervals are with low variability are shown. Three foreground system utilizations are evaluated, i.e., 10%, 30%, and 70%. Three background works are evaluated: 10%, 30%, and 60% of the foreground work. the scheduling policy for background jobs is first come, first served (FCFS).

Finite Background Work with Buffer Requirements

If the background work is finite but has buffer requirements then the goal is not only to complete the work but to complete it as fast as possible because unnecessary delays might cause the buffer to overflow and some of the background work to be dropped. In the cases such as low variability idle periods the way how the tuple (IW, $T_E$) is selected results in having the fastest service possible for background tasks. The issue is with high variability idle periods where the idle wait is non-zero as discussed above; most of the dropped background work is accounted for by reducing the idle wait as much as possible.

The performance results for finite background jobs with buffer requirements are given in Tables 9 and 10. The amount of work dropped increases with the utilization in the system. However a general assessment is that for low variability idle periods the drop rate is consistently lower than for idle periods with high variability. This is in contrast to the corresponding results when the finite background work has no buffer requirements. The conclusion is that high variability allows for more background work to be completed but this is achieved only at the cost of longer background response times. Foreground performance targets represent limitations that do not allow for systems with low variability and high variability to be treated similarly.

TABLE 10

| util | portion | IW   | $T_E$   | FG slowdown   | BG resp | BG drop |
|------|---------|------|---------|---------------|---------|---------|
| 10%  | 10%     | 20.9 | 10.4    | 16.8 (1.2%)   | 127.9   | 0.0     |
|      | 30%     | 36.6 | 20.9    | 17.2 (3.6%)   | 235.6   | 0.08    |
|      | 60%     | 68.1 | 41.9    | 17.3 (4.2%)   | 233.0   | 0.33    |
| 30%  | 10%     | 3.4  | 10.4    | 32.4 (3.9%)   | 235.5   | 0.05    |
|      | 30%     | 33.1 | 38.4    | 32.8 (5.2%)   | 217.3   | 0.38    |
|      | 60%     | 6.9  | 12.2    | 32.9 (5.5%)   | 546.9   | 0.71    |
| 70%  | 10%     | 0.0  | 51694.8 | 174.0 (1.0%)  | 680.1   | 0.58    |
|      | 30%     | 0.0  | 51694.8 | 174.8 (1.5%)  | 601.0   | 0.80    |
|      | 60%     | 0.0  | 51694.8 | 175.1 (1.7%)  | 567.6   | 0.89    |

Table 10 illustrates overall system performance for finite background jobs with buffer requirements when the idle intervals are with high variability. Three foreground system utilizations are evaluated, i.e., 10%, 30%, and 70%. Three background work amounts are evaluated: 10%, 30%, and 60% of the foreground work, the scheduling algorithm for background jobs is FCFS.

The results presented above in the evaluation have scheduled background jobs in a first come, first served (FCFS) fashion. Under FCFS scheduling, all background tasks have to wait for the background jobs ahead in the queue to be completed. This causes background response times to be high. In order to further improve on the background response time, another algorithm is evaluated, namely a last come, first served (LCFS) algorithm. LCFS treats jobs unfairly because the ones that just arrive are served first. In contrary, FCFS is a fair scheduling policy. Independent of this, the amount of background work completed and the amount of background work dropped overall will be the same within any scheduling policy used within a background busy period. However for specific features if response time is a metric of interest in addition to background completion time then one might choose LCFS instead of FCFS for the benefits set forth below.

We present results for the disclosed algorithm under the LCFS scheduling policy in Tables 11 and 12. The average background completion times are greatly improved. However, as expected the rest of the metrics of interest do not change because they are related to the amount of work served rather than the order.

TABLE 11

| util | portion | IW  | $T_E$ | FG slowdown   | BG resp | BG drop |
|------|---------|-----|-------|---------------|---------|---------|
| 10%  | 10%     | 0.0 | 45.3  | 10.008 (0.0%) | 10.0    | 0.0     |
|      | 30%     | 0.0 | 45.3  | 10.01 (0.0%)  | 10.0    | 0.0     |
|      | 60%     | 0.0 | 45.3  | 10.03 (0.2%)  | 10.0    | 0.0     |
| 30%  | 10%     | 0.0 | 10.5  | 10.9 (1.8%)   | 42.1    | 0.0     |
|      | 30%     | 0.0 | 10.5  | 11.3 (5.6%)   | 62.2    | 0.0     |
|      | 60%     | 0.0 | 10.5  | 11.7 (9.3%)   | 71.2    | 0.14    |
| 70%  | 10%     | 0.0 | 10.4  | 21.4 (5.8%)   | 220.8   | 0.33    |
|      | 30%     | 0.0 | 10.4  | 21.5 (6.8%)   | 51.4    | 0.75    |
|      | 60%     | 0.0 | 10.4  | 21.6 (6.8%)   | 19.4    | 0.87    |

Table 11 illustrates overall system performance for finite background jobs with buffer requirements when the idle intervals are with low variability. Three foreground system utilizations are evaluated, i.e., 10%, 30%, and 70%. Three background work amounts are evaluated: 10%, 30%, and 60% of the foreground work. The scheduling policy for background jobs is LCFS.

TABLE 12

| util | portion | IW   | $T_E$   | FG slowdown  | BG resp | BG drop |
|------|---------|------|---------|--------------|---------|---------|
| 10%  | 10%     | 20.9 | 10.4    | 16.8 (1.2%)  | 126.8   | 0.0     |
|      | 30%     | 36.6 | 20.9    | 17.2 (3.6%)  | 195.3   | 0.08    |
|      | 60%     | 68.1 | 41.9    | 17.3 (4.2%)  | 152.4   | 0.33    |
| 30%  | 10%     | 3.4  | 10.4    | 32.4 (3.9%)  | 201.1   | 0.05    |
|      | 30%     | 33.1 | 38.4    | 32.8 (5.2%)  | 122.6   | 0.38    |
|      | 60%     | 6.9  | 12.2    | 32.9 (5.5%)  | 55.2    | 0.71    |
| 70%  | 10%     | 0.0  | 51694.8 | 174.0 (1.0%) | 188.2   | 0.58    |
|      | 30%     | 0.0  | 51694.8 | 174.8 (1.5%) | 81.6    | 0.80    |
|      | 60%     | 0.0  | 51694.8 | 175.1 (1.7%) | 49.2    | 0.89    |

Table 12 illustrates overall system performance for finite background jobs with buffer requirements when the idle intervals are with high variability. Three foreground systems are evaluated, i.e., 10%, 30%, and 70%. Three background work amounts are evaluated: 10%, 30%, and 60% of the foreground work. The scheduling algorithm for background jobs is LCFS.

Figure 15:
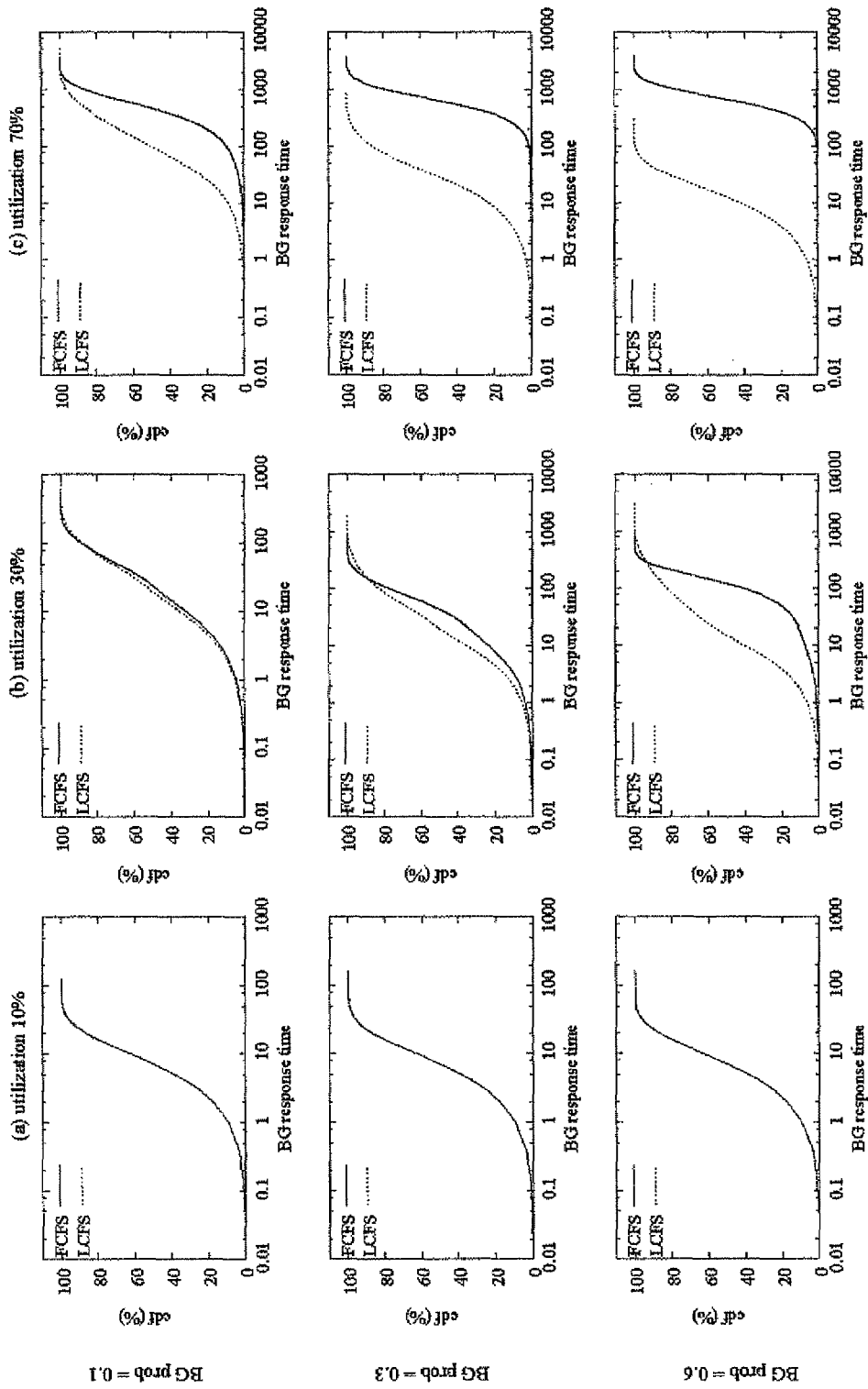
FIG. 15 illustrates CDF of the completion times of background jobs under two background scheduling algorithms (i.e., FCFS and LCFS) where the idle intervals are with low variability.
Figure 16:
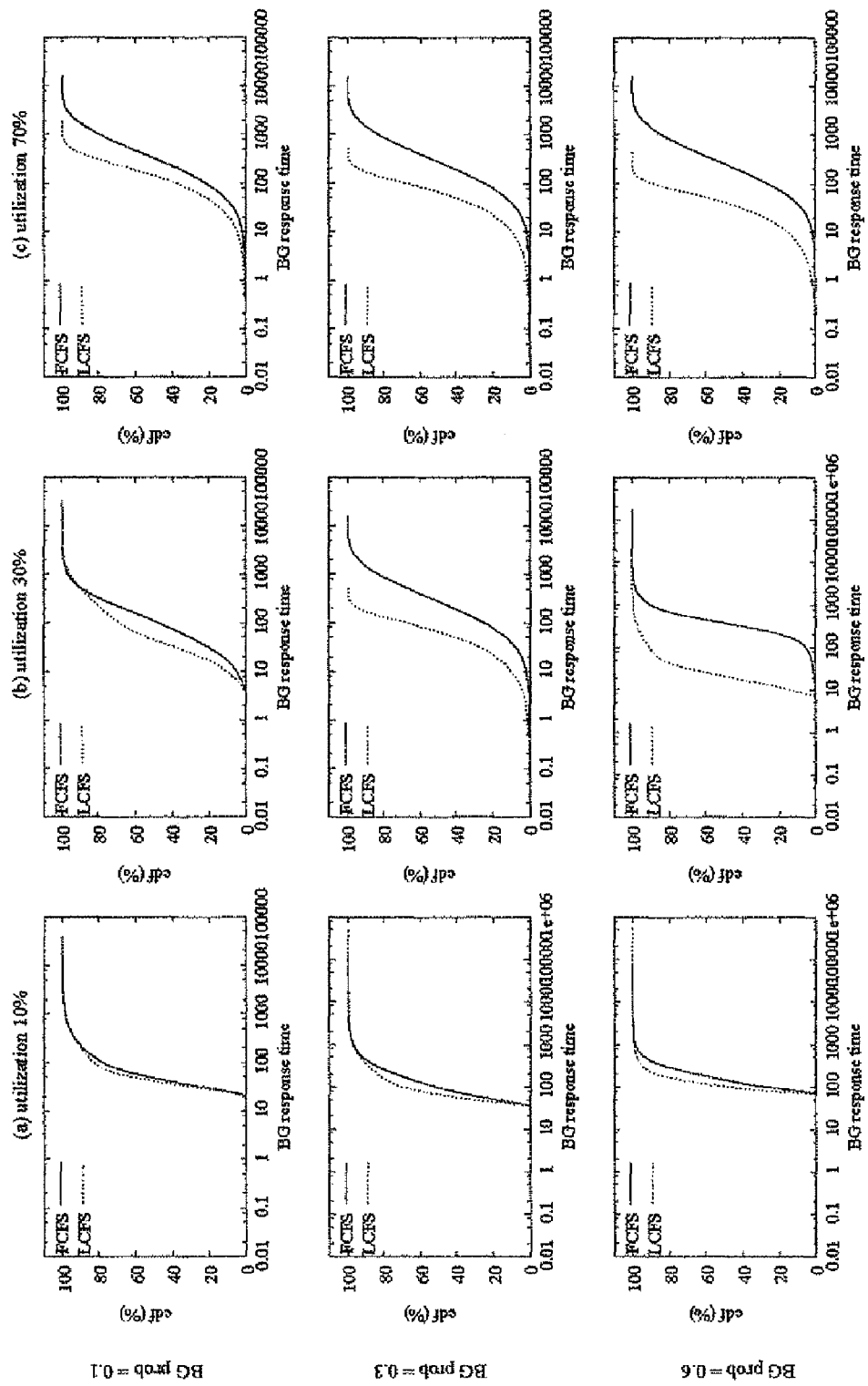
FIG. 16 illustrates CDF of the completion times of background jobs under two background scheduling policies (i.e., FCFS and LCFS) where the idle intervals are with high variability.

Next, a closer look is taken at the "unfairness" of the LCFS scheduling policy by plotting the distribution of background completions times under both LCFS and FCFS in FIGS. 15 and 16, where the idle intervals are with low variability and high variability, respectively. The LCFS policy has a longer tail in the distribution of background completion times (as expected because of unfairness). However this is observed only as the background work and the dropping rate increases.

Given that the dropped tasks are removed from the distribution then the long tail exist only for a very small portion of the background work. This is considered a small price to pay for huge benefits in response times under medium and large system utilizations. Choosing between FCFS and LCFS scheduling algorithms is separate from the main algorithm.

FIG. 15 illustrates CDF of the completion times of background jobs under two background scheduling algorithms (i.e., FCFS and LCFS) where the idle intervals are with low variability.

FIG. 16 illustrates CDF of the completion times of background jobs under two background scheduling policies (i.e., FCFS and LCFS) where the idle intervals are with high variability.

Figure 17:
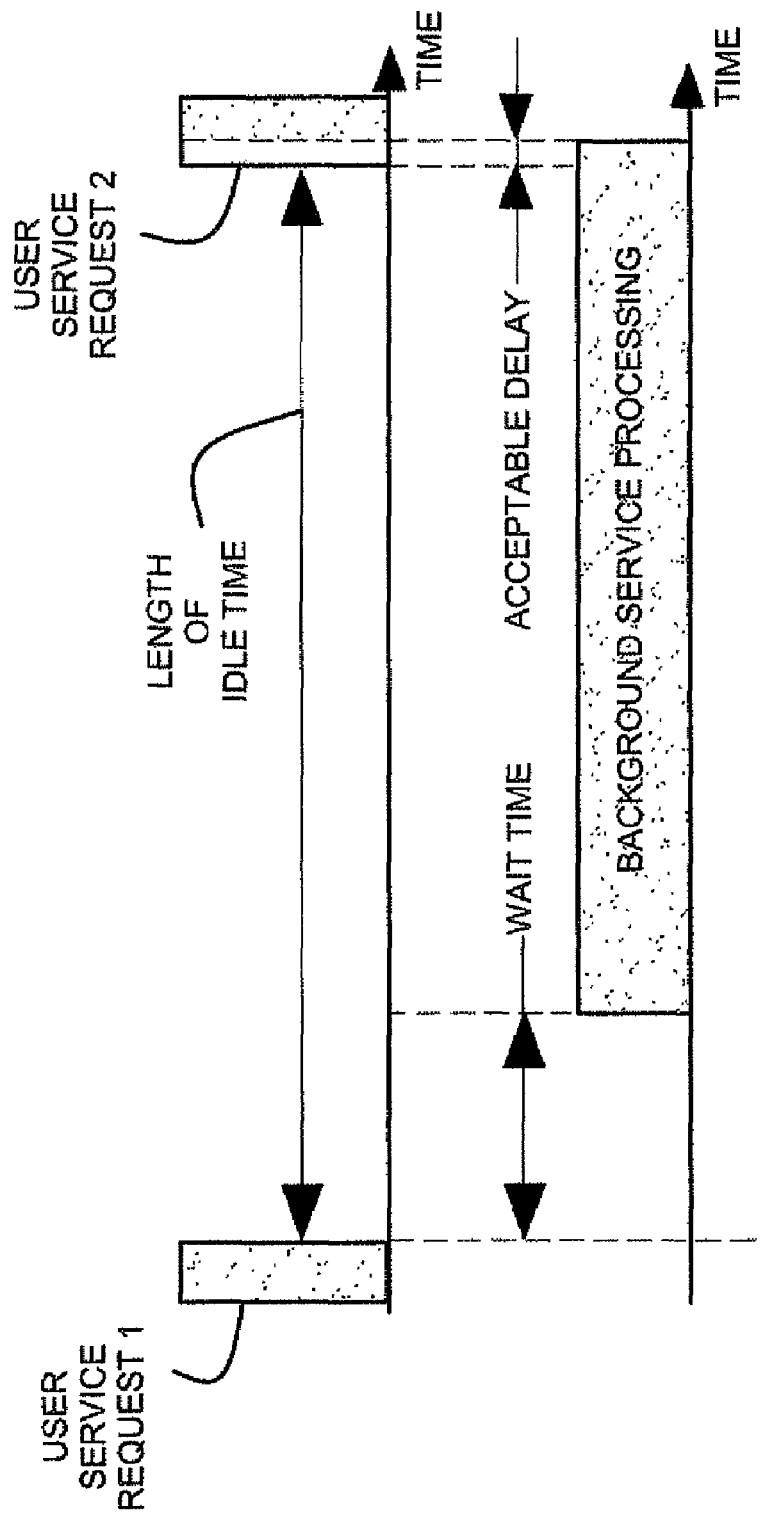
FIG. 17 illustrates a timing diagram of an example of servicing foreground and background jobs.

FIG. 17 illustrates a timing diagram of an example of servicing foreground and background jobs.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the scheduling system while maintaining substantially the same functionality without departing from the scope and spirit of the present invention. In addition, although the preferred embodiment described herein is directed to an embedded system for scheduling, it will be appreciated by those skilled in the art that the teachings of the present invention can be applied to systems in which the scheduling is partially performed by a host, without departing from the scope and spirit of the present invention.

What is claimed is:

1. An apparatus comprising:
    a cumulative data histogram comprising a distribution of past lengths of idle times;
    an update circuit that updates the cumulative data histogram with lengths of current idle times; and
    a schedule circuit that schedules a background service request following a user service request after a time delay that is controlled as a schedule function of the cumulative data histogram and a calculated length of a busy time of the background service request.

2. The apparatus of claim 1 wherein the schedule function maintains a performance level of an average wait time for starting service of foreground user service requests.

3. The apparatus of claim 1 wherein the time delay is controlled to maintain a performance level of an average wait time by dynamically responding to a distribution of idle times obtained by on line monitoring of recent idle times.

4. The apparatus of claim 1 wherein the schedule circuit schedules multiple background service requests during an idle time as a function of the cumulative data histogram.

5. The apparatus of claim 1 wherein the schedule circuit computes an acceptable delay for an incoming foreground busy period without violating a foreground service average performance target.

6. The apparatus of claim 1 wherein the schedule function comprises an idle waiting algorithm that avoids scheduling background tasks during short idle times.

7. The apparatus of claim 1 wherein the schedule function comprises a limit of the amount of background service requests that are serviced during an idle time.

8. The apparatus of claim 1 wherein starting of service of unstarted background service requests is preempted by arrival of a foreground user service request.

9. The apparatus of claim 1 wherein the schedule circuit provides a schedule, based on buffer space limitations, when the background service requests are more than what can be served in the available idle times and when the background service requests can be fit in the available idle times.

10. A data storage device, comprising:
    data storage media having stored thereon a cumulative data histogram comprising a distribution of past lengths of idle times of the data storage device; and
    a data storage device controller coupled to the data storage media and comprising an update circuit that updates the cumulative data histogram with lengths of idle times, and comprising a schedule circuit that schedules a background service request following a user service request after a time delay that is controlled as a function of the cumulative data histogram.

11. The data storage device of claim 10 wherein the data storage media comprises magnetic storage media.

12. The data storage device of claim 10 wherein the data storage media comprises ferroelectric storage media.

13. The data storage device of claim 10 wherein the data storage media comprises flash memory media.

14. The data storage device of claim 10 wherein the schedule circuit reduces an average wait time for starting service of the user service request.

15. The data storage device of claim 10 wherein the time delay is controlled to dynamically respond to a distribution of idle times obtained by on line monitoring of recent idle times.

16. The data storage device of claim 10 wherein the schedule circuit schedules multiple background service requests as a function of the cumulative data histogram.

17. The data storage device of claim 10 wherein the schedule circuit computes an acceptable delay for an incoming foreground busy period without violating a foreground service average performance target.

18. The data storage device of claim 10 wherein the schedule circuit comprises an idle waiting algorithm that avoids scheduling background tasks during short idle periods.

19. A method comprising:
    providing a cumulative data histogram comprising a distribution of past lengths of idle times between successive foreground user service requests;
    updating the cumulative data histogram with measured lengths of current idle times between successive user service requests; and
    scheduling a background service request following a user service request after a time delay that is controlled as a schedule function of the cumulative data histogram and a calculated length of a busy time of the background service request.

20. The method of claim 19 wherein the cumulative data histogram comprises 3-tuples of comprising a smallest point in a range of idle length intervals, an empirical probability of occurrence of an idle interval, and an empirical cumulative probability of an idle interval.

* * * * *